United States Patent
Fitzgibbon

(10) Patent No.: US 11,402,812 B1
(45) Date of Patent: Aug. 2, 2022

(54) APPARATUS AND METHOD FOR CONTROLLING A DEVICE

(71) Applicant: The Chamberlain Group LLC, Oak Brook, IL (US)

(72) Inventor: James J. Fitzgibbon, Batavia, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 48 days.

(21) Appl. No.: 16/825,327

(22) Filed: Mar. 20, 2020

Related U.S. Application Data

(60) Provisional application No. 62/822,532, filed on Mar. 22, 2019.

(51) Int. Cl.
*G05B 15/02* (2006.01)
*G06F 9/54* (2006.01)
(Continued)

(52) U.S. Cl.
CPC ........... *G05B 15/02* (2013.01); *G06F 3/0482* (2013.01); *G06F 3/04883* (2013.01); *G06F 9/542* (2013.01)

(58) Field of Classification Search
None
See application file for complete search history.

(56) References Cited

U.S. PATENT DOCUMENTS 6,947,995 B2 * 9/2005 Chang .................. G06Q 20/102
709/231
7,369,117 B2 5/2008 Evans
(Continued)

FOREIGN PATENT DOCUMENTS

CN 103283257 9/2013
CN 106998360 8/2017
(Continued)

OTHER PUBLICATIONS

Asante SmartHome; Asante Inc.; Lifestyle; Google Play, https://play.google.com/store/apps/details?id=com.uic.gmartgenie; 3 pages; Oct. 5, 2016.
(Continued)

*Primary Examiner* — Umut Onat
(74) *Attorney, Agent, or Firm* — Fitch, Even, Tabin & Flannery LLP

(57) ABSTRACT

In one aspect, a user device is provided that includes a processor configured to execute a user interface application, a controllable device application, and an operating system of the user device. The user device includes communication circuitry configured to facilitate communication between the controllable device application and the controllable device. The user interface application is configured to detect a notification of the controllable device application communicated to the operating system, the notification pertaining to a state of the controllable device associated with the controllable device application. The user interface application is configured to determine the state of the controllable device based at least in part on the notification of the controllable device application communicated to the operating system of the user device. The user interface application is configured to provide, via a user interface of the user device, the state of the controllable device determined by the user interface application.

37 Claims, 13 Drawing Sheets

(51) Int. Cl.
*G06F 3/0482* (2013.01)
*G06F 3/0488* (2022.01)
*G06F 3/04883* (2022.01)

(56) References Cited

U.S. PATENT DOCUMENTS

| | | | |
|---|---|---|---|
| 7,653,896 B2 | 1/2010 | Herdeg, III | |
| 7,840,970 B2 | 11/2010 | Liang | |
| 7,895,532 B2 | 2/2011 | Scott | |
| 8,218,739 B2 | 7/2012 | Styers | |
| 8,320,901 B2 | 11/2012 | Klein | |
| 8,352,875 B2 | 1/2013 | Peltz | |
| 8,686,949 B2 | 4/2014 | Tsai | |
| 8,769,551 B2 | 7/2014 | Lapuyade | |
| 8,981,929 B2* | 3/2015 | Nguyen | H04L 12/2834 |
| | | | 340/539.13 |
| 9,009,737 B2 | 4/2015 | Kim | |
| 9,117,087 B2 | 8/2015 | Tan | |
| 9,122,254 B2* | 9/2015 | Cate | H04L 67/1097 |
| 9,122,302 B2* | 9/2015 | Huang | H04W 4/80 |
| 9,141,099 B2* | 9/2015 | Cate | E05F 15/70 |
| 9,169,684 B2 | 10/2015 | Fan | |
| 9,245,441 B1 | 1/2016 | Poojary | |
| 9,376,851 B2* | 6/2016 | Cate | G05B 15/00 |
| 9,465,682 B1 | 10/2016 | Powell | |
| 9,620,005 B2 | 4/2017 | Geerlings | |
| 9,644,416 B2* | 5/2017 | Fitzgibbon | G05B 19/042 |
| 9,658,732 B2 | 5/2017 | Ording | |
| 9,698,997 B2 | 7/2017 | Arteaga-King | |
| 9,860,076 B2* | 1/2018 | Warren | G05B 15/02 |
| 10,054,290 B2* | 8/2018 | Birdwell | G02B 6/0008 |
| 10,061,782 B2* | 8/2018 | Hanna | H04N 1/00209 |
| 10,126,737 B2* | 11/2018 | Fitzgibbon | G05B 19/41855 |
| 10,138,671 B2* | 11/2018 | Fitzgibbon | E05F 15/60 |
| 10,169,006 B2 | 1/2019 | Kochura | |
| 10,333,733 B2 | 6/2019 | Chamarajnager | |
| 10,417,882 B2 | 9/2019 | Bretschneider | |
| 10,429,869 B2* | 10/2019 | Davis | H04W 84/18 |
| 10,563,456 B2* | 2/2020 | Bodurka | G05B 19/042 |
| 10,597,928 B2* | 3/2020 | Cate | E05F 15/40 |
| 10,652,743 B2* | 5/2020 | Fitzgibbon | H04W 12/06 |
| 10,739,762 B2* | 8/2020 | Fitzgibbon | G05B 19/41855 |
| 10,837,217 B2* | 11/2020 | Cate | H04W 4/022 |
| 10,907,398 B2* | 2/2021 | Cate | E05F 15/77 |
| 10,934,763 B2* | 3/2021 | Fitzgibbon | E05F 15/41 |
| 11,010,999 B2* | 5/2021 | Cate | G06F 9/451 |
| 2010/0235261 A1 | 9/2010 | Lloyd | |
| 2012/0096085 A1 | 4/2012 | Yoon | |
| 2012/0154195 A1 | 6/2012 | Nystrom | |
| 2012/0179781 A1 | 7/2012 | Onogi | |
| 2014/0171032 A1* | 6/2014 | Huang | H04W 4/80 |
| | | | 455/414.1 |
| 2014/0266592 A1 | 9/2014 | Dahl | |
| 2016/0149716 A1* | 5/2016 | Raj | H04L 12/2832 |
| | | | 700/275 |
| 2016/0224220 A1* | 8/2016 | Ganguly | G06F 3/0482 |
| 2017/0150058 A1* | 5/2017 | Hanna | G06F 16/40 |
| 2017/0214584 A1 | 7/2017 | Kanojia | |
| 2017/0228127 A1 | 8/2017 | Mukherjee | |
| 2017/0249076 A1* | 8/2017 | Smith | G06F 3/0485 |
| 2017/0285886 A1* | 10/2017 | Klima | G06F 3/0482 |
| 2017/0316630 A1 | 11/2017 | Zeinstra | |
| 2017/0359190 A1 | 12/2017 | Nadathur | |

FOREIGN PATENT DOCUMENTS

| | | |
|---|---|---|
| CN | 107273227 | 10/2017 |
| EP | 1193937 | 4/2002 |
| EP | 1432272 | 6/2004 |
| EP | 1495584 | 1/2005 |
| EP | 2073183 | 6/2009 |
| EP | 2403246 | 1/2012 |
| EP | 3422688 | 1/2019 |
| KR | 20130024857 | 3/2013 |
| WO | 2009025499 | 2/2009 |
| WO | 2016209853 | 12/2016 |
| WO | 2017141219 | 8/2017 |

OTHER PUBLICATIONS

Frank D. Greco; Redirection, or "They Went That-a-Way"; PJ Jan./Feb. 1987; 13 Pages.

GarageDoorBuddy Monitor; Brocel Corporation; Lifestyle; Google Play, https://playgoogle.com/store/apps/details?id=com.brocel.gdbmonitor; 3 pages; Aug. 16, 2012.

GarageMate;BlueMate Labs Inc.; Garage Door Remote Control App.; https://bluemate.com; 5 pages; Jun. 28, 2016.

George Defenbaugh, Parents, Children, Redirection, and Piping with DO Functions 45H and 46H, PJ Nov./Dec. 1986; 5 Pages.

MyQ Garage & Access Control; The Chamberlain Group, Inc.; Lifestyle; Google Play, https://play.google.com/store/apps/details?id=com.chamberlain.android.liftmaster.myq&hl=en_US; 3 pages; Mar. 18, 2019.

Nexx Garage; SimpalTek, LLC, Lifestyle; Google Play, https://play.google.com/store/apps/details?id=com.simpalTEK.mobile.nexxGarage; 3 pages; Mar. 20, 2018.

Stackify; Soap Vsw. Rest: The Differences and Benefits Between the Two Widely-Used Web SErvice Communication Protocols; Mar. 14, 2017; Developer Tips, Tricks & Resources (https://stackify.com/developers/); https://stackify.com/soap-vs-rest/; 10 pages.

Disk Operating System by Microsoft Corporation, Version 2.10, First Edition (Sep. 1983); 553 Pages.

N.L. Seidenman; NBS Technical Note 1208; PIPE/1000: An Implementation of Piping on an HP-1000 Microcomputer; 60 pages; Mar. 1985.

\* cited by examiner

_US 11,402,812 B1_

APPARATUS AND METHOD FOR CONTROLLING A DEVICE

CROSS-REFERENCE TO RELATED APPLICATION

This application claims the benefit of U.S. Provisional application No. 62/822,532, filed Mar. 22, 2019, entitled APPARATUS AND METHOD FOR CONTROLLING A DEVICE, which is incorporated by reference in its entirety herein.

FIELD

The present disclosure generally relates to apparatuses and methods for controlling devices and, more specifically, relates to controlling devices that are controlled using different applications running on a user device.

BACKGROUND

Controllable devices, such as movable barrier operators, may be controlled by a variety of remote controls, including by a user device such as a smartphone. When using a smartphone to control a movable barrier operator, a user may first install an application that is associated with the movable barrier operator to be controlled. The user establishes an account associated with the application, enters the user's credential (e.g. username login and password) information into the application, and enters information about the movable barrier operator (e.g., a serial number) so that a server computer may associate the movable barrier operator with the user's account. Once the movable barrier operator and the user's account are associated, the user can monitor and control the movable barrier operator with the smartphone application. When the movable barrier operator is a garage door opener, the user can open and close the garage door by actuating the garage door opener using the associated smartphone application. The smartphone can communicate with the garage door opener by sending a command directly to the garage door opener, e.g., using Bluetooth®, or by sending the command indirectly, e.g., communicating with a server computer via a cellular network or Wi-Fi network and the internet to cause the server computer to send the command to the garage door opener over the internet.

One problem that arises is that a user may need to use a different smartphone application for each controllable device used by the user. For example, each manufacturer may have a smartphone application that is only associated with the manufacturer's controllable devices. To operate a particular controllable device, a user opens the application associated with that controllable device and uses the application to send a command to the controllable device. This is inconvenient for a user because they may need to open different applications to control different controllable devices in the user's home. The segregation of one application and the application's associated controllable devices from another application and the other application's associated controllable devices stems, in one aspect, from the client-application program interface (API)-server architecture commonly utilized by controllable device manufacturers. More specifically, the client-API-server architecture permits manufacturers to manage security and functionality of the manufacturer's network but, as a consequence, limits the manner in which user devices may interact with the manufacturers' servers.

One prior approach for operating controllable devices from multiple manufacturers in the home automation space is the If This Then That (IFTTT) web-based service. IFTTT permits a user to program applets having triggers and actions that interact with home automation applications according to a series of logical steps. While useful for some situations, the predetermined logical operations employed by the IFTTT service limits the applicability of the IFTTT service to situations where users desire or expect flexibility in operating controllable devices.

Figure 1:
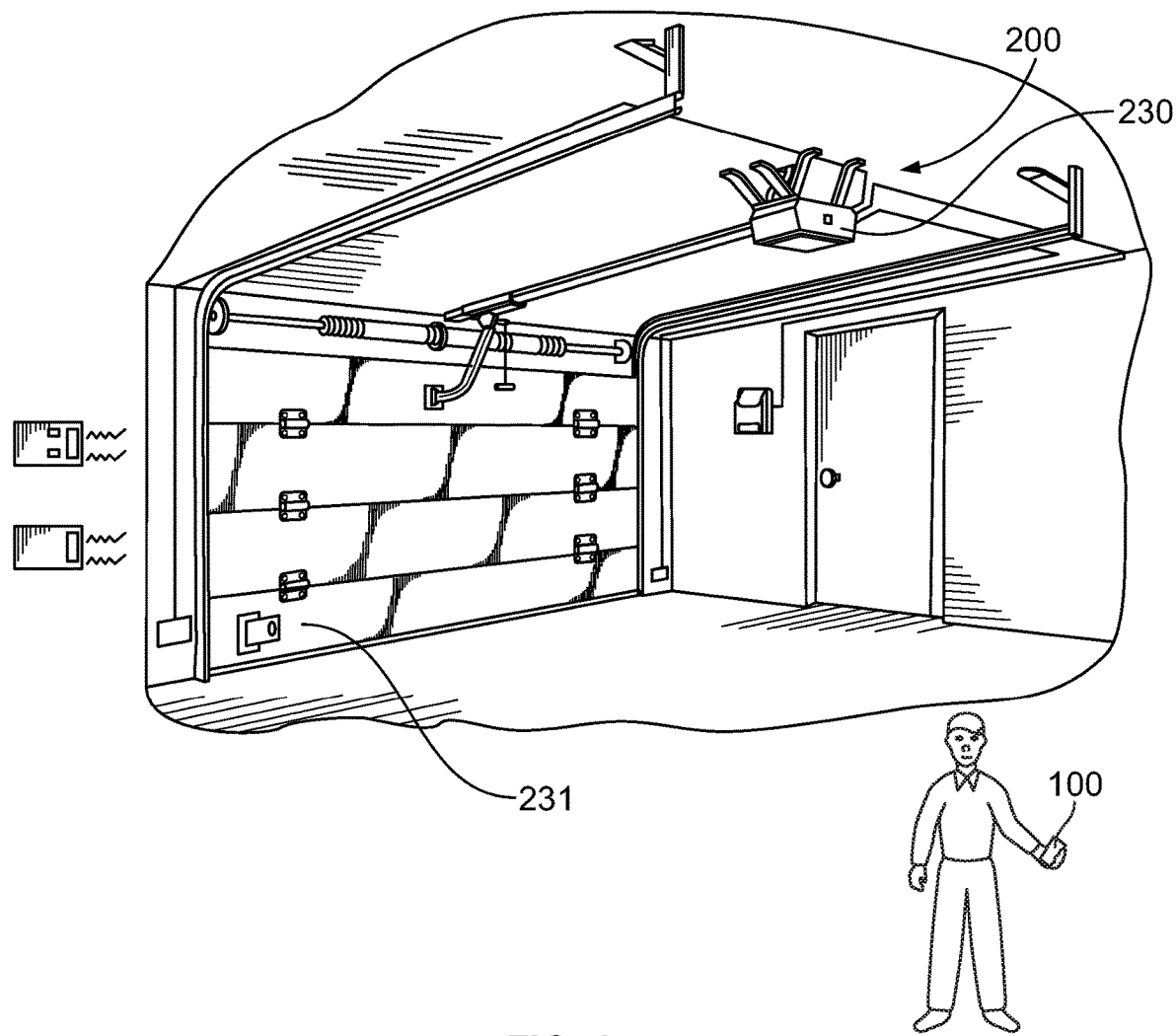
FIG. 1 is a perspective view of an example controllable device and user device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required.

It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one aspect, a system is provided that includes a user device and one or more controllable devices, such as garage door openers. The controllable devices are network-enabled devices that are configured to be controlled over one or more networks. The user device has a processor configured to operate a user interface application and one or more controllable device applications. In one embodiment, the one or more controllable device applications includes a plurality of controllable device applications that are each associated with one or more controllable devices not associated with another controllable device application. Individual ones of the controllable device applications are configured to, in response to a user input, request a state change of at least one controllable device and/or receive a status of the at least one controllable device.

The user interface application is displayed or otherwise presented to a user by a user interface of the user device. The user interface application is configured to control the one or more controllable device applications and permit a user to operate the controllable devices associated with the one or more controllable device applications. The user interface application provides a single interface for a user to control different controllable devices made and/or sold by different manufacturers and controlled by different controllable device applications. Further, the user interface application permits monitoring and control of the controllable devices without the user having to interact with each controllable device application to operate the associated controllable devices.

For example, the controllable device applications may each have a respective graphical user interface (GUI) that is displayed to a user when the user opens the controllable device application. The user interface application likewise has a user interface, such as a GUI, that is displayed to the user when the user opens the user interface application. To control a controllable device using the user interface application, the user opens the user interface application, selects a controllable device, and provides a user input (e.g., tap, swipe, gesture) to the GUI of the user interface application that requests a state change of the selected controllable device. In response to the user input, the user interface application provides (e.g. via one or more layers of the user device's operating system) a counterpart input to the GUI of the controllable device application associated with the selected controllable device. The controllable device application then initiates the requested state change of the controllable device.

In one embodiment, the user interface application identifies the available controllable device applications present on the user device and learns or otherwise determines how to control the controllable device applications. The learning process may involve, for example, the user providing user credentials for each of the controllable device applications to the user interface application so that the user interface application may login to the controllable device applications as if the user interface application were the user. The learning process may also involve the user interface application prompting the user to operate the controllable device applications to request a state change or a status update of a controllable device, e.g., using a garage door manufacturer's application to open a garage door, and saving in a memory of the user device the user's interactions with the controllable device applications. Upon the user subsequently making a similar state change request at the user interface application, the user interface application identifies the controllable device application associated with the state change request and interacts with the controllable device application as previously learned from monitoring the user's interactions with the controllable device application.

The user interface application may provide functionality for controllable devices not provided by the associated controllable device applications. For example, the controllable devices may include a garage door opener and the associated controllable device application is an application provided by the garage door opener manufacturer. The garage door opener manufacturer's application may not provide location-based operation of the garage door opener, e.g., open the garage door if the user's vehicle has entered a geofenced area near the garage. The user device may be an in-vehicle device that includes a global navigation satellite system receiver, such as a GPS receiver. The in-vehicle device has the user interface application and the garage door opener manufacturer's applications installed therein. The user interface application may be configured to receive location data from the GPS receiver, determine whether the vehicle has entered the geofenced area, and control the garage door opener manufacturer's application to effectuate opening of the garage door upon the vehicle entering the geofenced area. In this manner, the user interface application provides higher-level or more complex functionality while the controllable device application facilitates the lower-level or less complex interactions with the controllable device. In this way the user interface application is operable to stitch together, or otherwise coordinate functions and/or features of one or more underlying controllable device applications. Further, the user interface application may be readily updated or modified by the user to have new functionality without changing the underlying controllable device application.

The user interface application may have a GUI different than the GUIs of the controllable device applications controlled by the user interface application. For example, the system may permit a user to customize the look and feel of the GUI of the user interface application and tailor the appearance of the user interface application to the user's interactions with the user interface application. The flexibility of the user interface application to customize or personalize the GUI of the user interface application may not be limited by the look and feel of the underlying controllable device applications. Further, the layout of the GUI of the user interface application may be changed at any time without changing the underlying controllable device applications.

In one embodiment, the user interface application does not receive a user's credentials for the controllable devices. Rather, the user provides the user's credential to each controllable device application, such as upon installation of the controllable device application, and the user interface application controls the controllable device application after the user's credentials have been provided to the controllable device applications.

The user interface application thereby does not need to be credentialed since the controllable device applications have already been credentialed and the controllable device application completes the interactions with the controllable device. Further, the user may change a credential (e.g.

password) in one of the controllable device applications directly and may not have to update the credential in the user interface application. Once initialized, both the controllable device applications and the user interface application can allow full monitoring and control of the controllable devices.

Regarding FIG. 1, a user device 100 provides a user interface application 150 that is operable to control a controllable device 200 by causing actuation of a controllable device application to send a command to the controllable device 200. The user device 100 can be any device that allows applications to activate the controllable device 200. Examples of the user device 100 include computing devices such as cell phones, in-vehicle devices (e.g. infotainment, navigation or telematics systems), tablet computers, smartwatches, and personal computers. In one embodiment, the user interface application 150 (see FIG. 4A) is installed on the user device 100 and controls a controllable device application 250 installed on the user device 100 and associated with the controllable device 200 to operate the controllable device 200. In another embodiment, the user interface application 150 may perform a translation of a request from a user and communicate directly with the controllable device 200 or indirectly with the controllable device 200 via an application program interface (API) and a server computer.

The user device 100 may have a plurality of controllable device applications 250 that each control one or more controllable devices 200. The user device 100 with the user interface application 150 permits a user to control all or a substantial majority of the user's controllable devices 200 from a single application (i.e., the user interface application 150), even if each controllable device 200 is typically controlled by a different controllable device application 250. The ability of the user interface application 150 to control the controllable device application 150 also allows the user interface application 150 to be unrelated to the manufacturer of the controllable device 200 while still permitting a user to control the controllable device 200. For example, the user interface application 150 may be an e-commerce application that permits a user to authorize a delivery associate to open and close the user's garage door to allow delivery personnel to deliver a package inside the user's garage without the user having to interact with a garage door control application on the user device 100.

Figure 2:
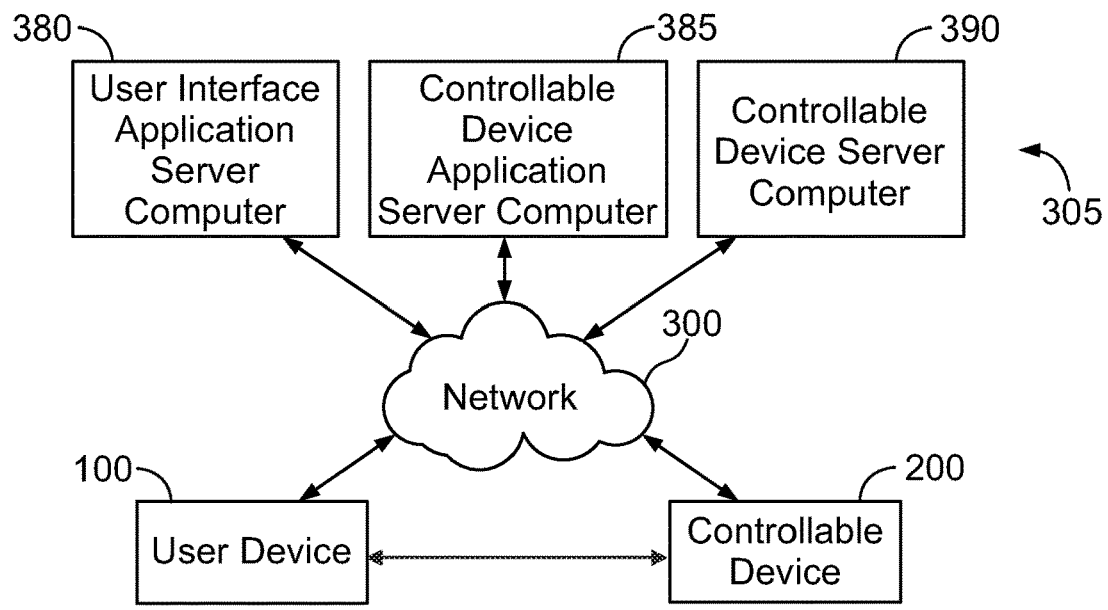
FIG. 2 is a block diagram of an example system including the user device of FIG. 1 shown in communication with the controllable device over a network.

The user device 100 and the user interface application 150 may be used to control a plurality of controllable devices 200 from different manufacturers. With reference to FIG. 2, the user device 100 may communicate directly with the controllable device 200 or may communicate with the controllable device 200 over a network 300. The network 300 may include one or more networks such as wide area networks (e.g., cellular, WiMAX, LoRaWAN), local area networks (e.g., a home WiFi or WiLAN network), a fiber optic network, and the internet. The network 300 is connected to one or more remote servers 305, the user device 100, and the controllable device 200. The remote servers 305 may include one or more computers that provide functionality for an application on the user device 100, such as the user interface application 150 or the controllable device application 250. The remote servers 305 may also provide functionality for the controllable devices 200. The controllable device 200 may include one or more of a movable barrier operator 230 (FIG. 1), a door lock, a delivery lock box, a security system, camera, and/or a light, as some examples. The remote servers 305 may include a user interface application server computer 380, a controllable device application server computer 385, and a controllable device server computer 390. Although remote servers 305 are shown as separate and distinct server computers 380, 385, 390, it is understood that various configurations for server computers 380, 385, 390 may be employed (e.g. computers can be separated or consolidated/combined). These remote servers 305 may communicate with one another over the network 300. For example, upon receiving a request for a state change from the controllable device application 250, the controllable device application server computer 385 may communicate with the controllable device server computer 390 to cause the controllable device server computer 390 to send a command to the controllable device 200 and effectuate a state change of the controllable device 200.

Figure 3:
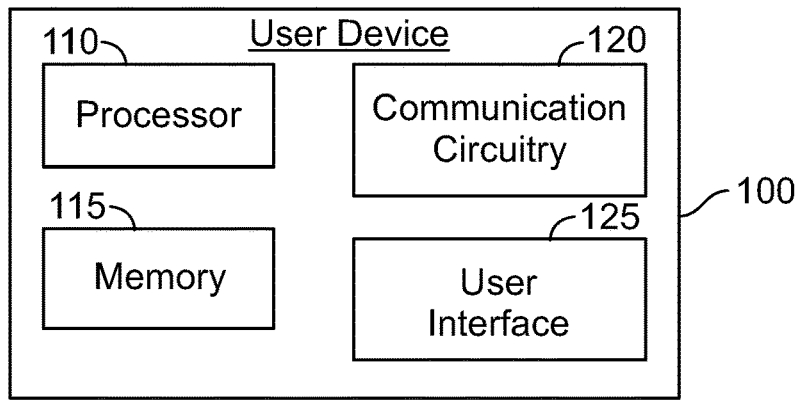
FIG. 3 is a block diagram of the user device of FIG. 1.

The user device 100 may include a number of different electronic devices, such as a smartphone, a wearable (e.g. smartwatch), personal computer, in-vehicle devices (e.g. infotainment, navigation and telematics systems), or tablet computer to name a few examples. Another example of the user device 100 is a package delivery device having a display screen and a barcode scanner that may utilized by delivery persons to facilitate and verify delivery of packages. Regarding FIG. 3, the user device 100 includes a processor 110 in communication with a non-transitory computer readable medium such as a memory 115, communication circuitry 120, and a user interface 125. The memory 115 is configured to store instructions for performing operations, such as the methods discussed below with respect to FIGS. 5A and 5B.

The communication circuitry 120 may communicate using at least one of wired or wireless approaches, including short-range (e.g., Bluetooth®, WiFi, ZIGBEE, Z-wave, infrared, etc.) and long-range (e.g., 3G, 4G, 4G LTE, 5G, WiMAX, LoRaWAN, 900 MHz frequency) wireless communication protocols. The user interface 125 allows the user to provide input to the user device 100 and provides information to the user. The user interface 125 may include, for example, one or more of a touchscreen display, a microphone, a speaker, a heads up display, an augmented reality display, and a holographic display. The user interface 125 may also include a physical or virtual keyboard for receiving a user's input.

The processor 110 of the user device 100 executes computer-readable instructions to instantiate the operating system 130 (see FIG. 4A), the user interface application 150, and the controllable device application 250. The processor 110 may facilitate sending and receiving information regarding the various applications of the user device 100 via the communication circuitry 120. This information may include, for example, a command to a controllable device 200 or a status update from a controllable device 200 associated with a controllable device application 250 of the user device 100.

The operating system 130 on the user device 100 is constituted by computer-readable instructions for controlling the various functions of the user device 100. The operating system 130 includes a plurality of layers and facilitates the basic functionality of the user device 100 including operation of the applications of the user device 100. One function of the operating system 130 is managing (e.g., displaying and storing) notifications from the applications of the user device 100, which will be discussed in more detail below.

Figure 4A:
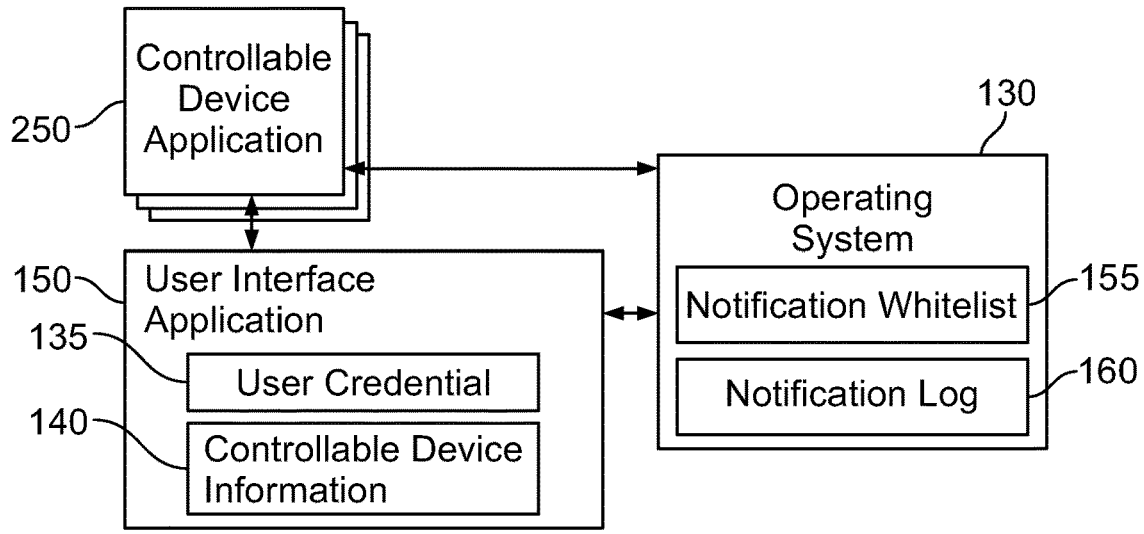
FIG. 4A is an example block diagram showing interactions between a user interface application, a controllable device application, and an operating system of the user device of FIG. 3.
Figure 4B:
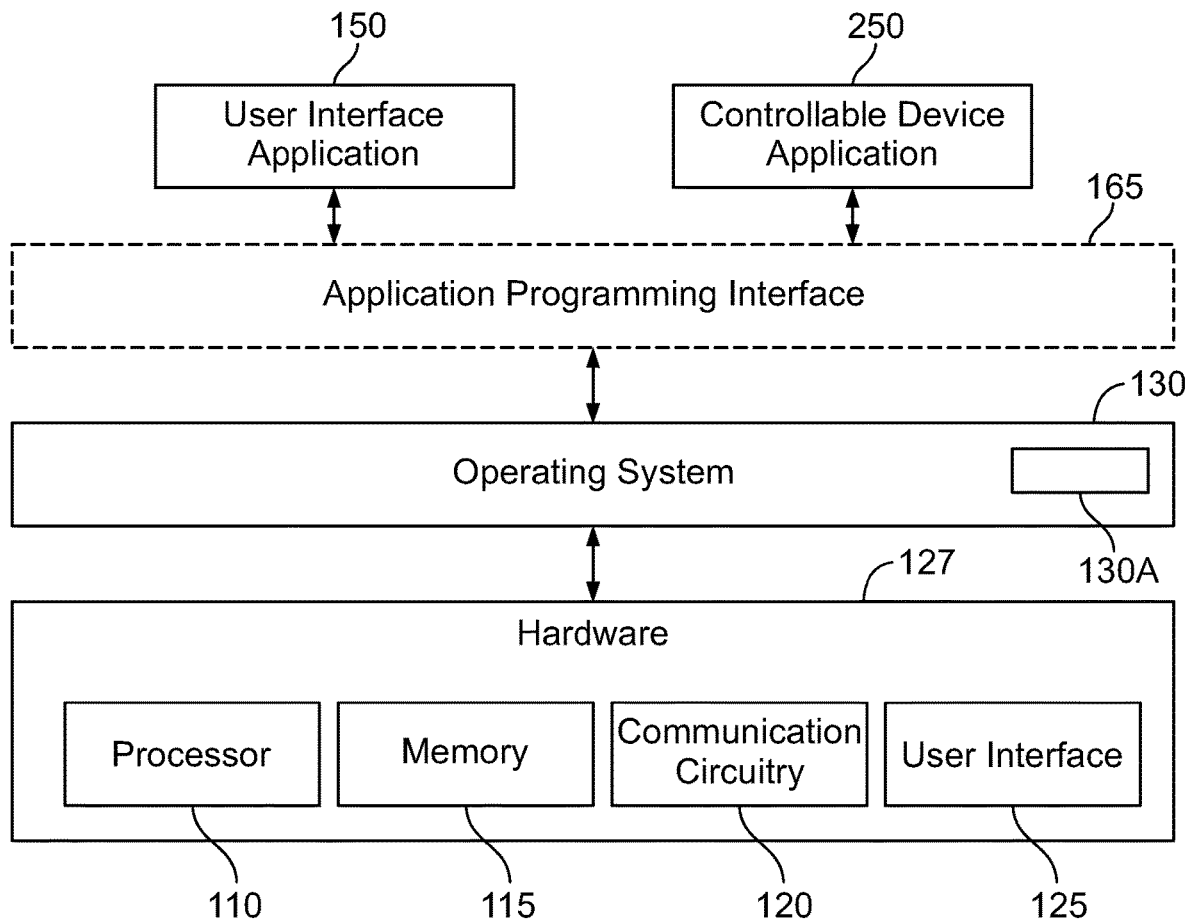
FIG. 4B is an example block diagram of interactions between a user interface application, a controllable device application, an application programming interface, an operating system, and hardware of the user device of FIG. 1.

Regarding FIG. 4A, the user device 100 operates the user interface application 150, the controllable device application 250, and the operating system 130. The user interface application 150, the controllable device application 250, and the operating system 130 form layers of the software stack of the user device 100. A high-level view of the layers of the software stack of the user device 100 are shown in FIG. 4B. The user device 100 includes hardware 127 at the bottom of the stack. The hardware includes the processor 110, memory 115, communication circuitry 120, and the user interface 125. The operating system 130 may be the lowest layer of software in the stack and, among other functions, interfaces with the hardware of the user device 100. The operating system 130 may be run or instantiated on the processor 110. The operating system 130 may include various hardware drivers and/or firmware used to interface with the hardware 127 of the user device 100. These drivers and/or firmware provide the instructions and/or code for communicating with and/or controlling the various hardware 127 components of the user device 100. The operating system 130 may also manage power usage, memory usage, processor provisioning, access control to the user device 100, and/or generally manage the functionality of the user device 100. The operating system 130 may manage the notifications of the various applications installed on the user device 100, for example, receiving a push notification from an application or the application's server computer and pushing, presenting or displaying the notification to the user via the user interface 125. The user interface application 150 and controllable device application 250 communicate with and run on the operating system 130.

The user interface application 150, controllable device application 250, and other applications on the user device 100 communicate with and through the operating system 130 to operate. The applications of the user device 100 are thus shown as a higher level in the software stack. The user interface application 150 and controllable device application 250 may communicate with the operating system 130 via an application programming interface 165 (see FIG. 4B). The application programming interface 165 may include various plugins or instructions for interfacing or communicating information and operational tasks with the operating system 130 and the processor 110. The application programming interface 165 makes data and functions available to the higher-level software including applications of the user device 100. Alternatively or additionally, the application programming interface 165 may make data and functions available to processes running external to the user device 100 such as the network management platform 11. The applications may make function calls to the application programming interface 165, which directs the function call via the operating system 130 to the processor 110 to be carried out. Some applications, however, may not use an application programming interface 165 and may interface directly with the operating system 130. In these embodiments, the user interface application 150 and controllable device application 250 may be configured to communicate with and/or run directly on the operating system 130.

The user interface application 150 and the controllable device application 250 may run or execute on the user device 100 in the foreground or the background. As one example, the user interface application 150 runs in the foreground on the user device 100 and several controllable device applications 250 run in the background. The controllable device applications 250 may stay in the background because the user interface application 150 controls the operability of the applications 250 so that a user does not need to interact with the applications 250 after the user interface application 150 has been configured to control the applications 250. In this manner, the user interface application 150 is configured to substantially eliminate or break down application-service siloes thereby allowing users to control controllable devices 200 associated with the other controllable device applications 250 via a single application, i.e. the user interface application 150.

Each controllable device application 250 is also in communication with and runs on the operating system 130. The controllable device application 250 is associated with one or more controllable devices 200. This association between the controllable device application 250 and the controllable device 200 is established by a user, such as by the user creating a user account and entering information about each controllable device (e.g., a serial number) into the controllable device application 250. The controllable device application 250 contains programs (e.g. routines and/or instructions) that cause output of commands to control the controllable device 200. A user may open the controllable device application 250, select one of the associated controllable devices 200, and send a command to the controllable device 200. The controllable device 200 could be, as one example, a garage door opener. For example, the user signs into the user's account on the controllable device application 250 and selects to open or close a garage door by actuation of the garage door opener previously associated with the user's account. The controllable device application 250 sends the command to the garage door opener. The sending of the command may be performed by having the controllable device application 250 use the operating system 130 to cause the communication circuitry 120 to transmit a command to the controllable device 200. The transmission of the command may be performed by sending a signal directly to the controllable device 200 by using a local signal, such as a radio signal, Bluetooth® Low Energy, ZIGBEE or the like. Alternatively, the communication circuitry 120 transmits the command over the network 300 to the controllable device 200. The network 300 carries the command from the controllable device application 250 to the controllable device application server computer 385, which processes the command and sends a corresponding command to the controllable device 200 over the network 300. Upon receiving the command, the controllable device 200 may respond to the command by changing a state of the controllable device 200, such as opening/closing a garage door, turning on/off a light, or arming/disarming a security system.

Regarding FIG. 4A, the user device 100 is also configured to run the user interface application 150. The user interface application 150 may have a GUI that is updatable or editable by a user, such as having a skin selectable by a user. The user interface application 150 may have a variety of functions, including the same or substantially similar functions as the controllable device application 250, e.g., functions for controlling the controllable device 200. The user interface application 150 may also provide different functionality, such as a shopping application or a delivery application as examples. The user interface application 150 may request or prompt the user to identify the controllable device applications 250 on the user device 150 and provide a unique identifier for each of the controllable device applications 250, such as a user credential 135. The user credential 135 may include, for example, a username, password, and/or biometric information or data such as a user fingerprint, iris scan or facial image. Once the user has set up the user interface application 150, the user can select which controllable devices 200 and the respective applications 250 to control. In one embodiment, the user interface application 150 facilitates the user's selection of the controllable devices 200 by determining which controllable devices 200 the user can control and displaying the controllable devices 200 to the user. The user interface application 150 may determine the available controllable devices 200 by employing a controllable-device discovery process, for example, communicating with the user device's operating system via an abstraction layer to identify the controllable device applications 250 or by reviewing a notification log of the user device 100. In one embodiment, the user interface application 150 may prompt a user to turn on notifications for one or more controllable device applications 250 and/or automatically turn on notifications for one or more controllable device applications 250 to permit the user interface application 150 to monitor and control the one or more controllable device applications 250. The user interface application 150 may then monitor the notifications or notification log 160 of the user device 100 and identify notifications indicative of a controllable device 200 associated with the application producing the notification.

The user interface application 150 may include controllable device information 140 relating to the controllable devices 200 such as the user credentials for the controllable device application 250 and/or instructions for how user interface application 150 controls or operates the controllable device application 250. The instructions for how the user interface application 150 controls or operates the controllable device application 250 may include a translation process that translates a user input at the user interface application 150 into an intermediate output from the user interface application 150. Such an intermediate output from the user interface application may be communicated via an abstraction layer (or the like) of the operating system for reception by the controllable device application 250. The intermediate output causes the controllable device application 250 to communicate an output to the controllable device 200.

Figure 8B:
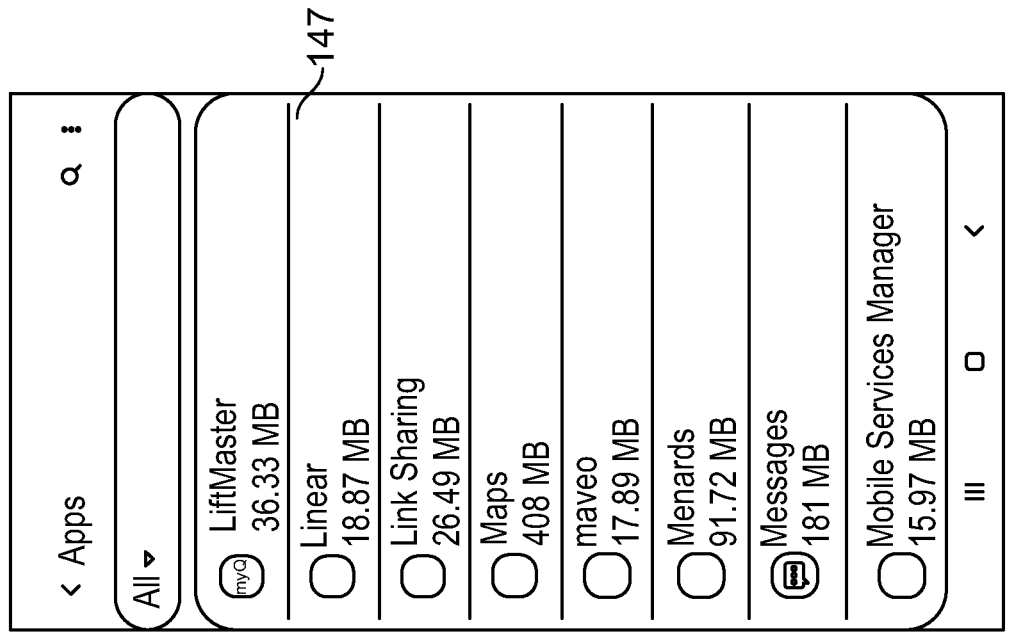
FIG. 8B is an example of a list of applications installed on the user device of FIG. 3.

The determination of the type of controllable devices 200 and how to control the devices 200 may be detected from the operating system 130 in a number of ways. Assuming that the controllable device application 250 is installed, the user interface application 150 may identify one or more controllable device applications 250 via communication with the operating system 130. The device 200 to be controlled may be detected from the notifications and from knowledge of a heuristic regarding what various applications are in communication with the operating system 130. The notifications may identify the application and the device. Regarding FIG. 8A, a notification 145 provides an alert that the LiftMaster® application has just closed a "large door." Regarding FIG. 8B, the operating system 130 identifies which applications are installed and may provide the user with a list 147 of the installed applications. In the list 147, the LiftMaster® application is identified along with others (LINEAR, MAVEO). The application 150 obtains control of the applications 250 using the information contained in the list 147 and knowledge of how the applications 250 are operated. Regarding FIG. 8C, the operating system 130 may provide an indication 149 that the LiftMaster® application has notifications turned on.

The user interface application 150 may control the controllable device 200 associated with the controllable device application 250 in a variety of approaches. In one embodiment shown in FIG. 5A, a method 400 is provided that includes a user causing execution/instantiation, running or opening 402 the user interface application 150. The user may select 404 which controllable device 200 to control. In some instances, the user enters 406 the user credential information for the controllable device application 250 associated with the selected controllable device 200 into the user interface application 150. For example, the user may enter user credential information if the controllable device application 250 was secured or protected from unauthorized use.

The user interface application 150 stores 408 the user credential information along with information identifying the controllable device application 250 for which the user credentials are associated. Some controllable device applications 250 either do not restrict access or allow the credentials to be stored within and therefore do not need the credentials to be reentered to open, run, access or activate the device application.

The user inputs 410 a state change request for a controllable device 200. In order to execute the state change request, in one embodiment the user interface application 150 retrieves instructions from the memory 115 regarding how to control the controllable device application 250. The instructions may have been a component of the user interface application 150 that is stored in the memory 115 upon installation of the user interface application 150. Alternatively or additionally, the user device 100 may receive updates for the user interface application 150 and the updates include up-to-date instructions for controlling the controllable device application 250. The user device 100 may receive updates from an application store (e.g. Play Store or App Store managed by Google and Apple respectively) or another repository of application data. As another example, the user interface application 150 may learn how to control the controllable device application 250 by running in the background and monitoring user inputs as the user operates the controllable device application 250. The user interface application 150 may provide a wizard that prompts a user to perform various user inputs, e.g., displaying "press garage open button," as part of the learning process.

In one embodiment, the user interface application 150 may request 412 instructions from the user interface application server computer 380 regarding how to control or operate the controllable device application 250. These instructions may contain, for example, the configuration (e.g., shape, size, X-Y or pixel coordinates, etc.) of the buttons displayed on a screen of the user device 100 by the application 250 that when pressed cause the application 250 to send the desired command to the controllable device 200. The instructions may also include the sequence of screens the controllable device application 250 will display and the correct button to press on each screen to execute the desired change of state. For example, the instructions from the user interface application server computer 380 may include a first set of X-Y coordinates for an "open" button of the application 250 in response to the user requesting a change of state of a garage door from a closed position to an open position and a second set of X-Y coordinates for a "close" button of the application 250 in response to the user requesting the garage door move from an open position to a closed position. To carry out the instructions based on the X-Y coordinates of the interface components of the controllable device application 250, the user interface application 150 may communicate with the operating system 130 to emulate user input signals at or within a threshold distance from the X-Y coordinates of the interface components of the controllable device application 250. For example, for a user device 100 having a touch screen, the user interface application 150 causes the operating system 130 to send a signal to the controllable device application 250 that simulates a user touching a portion of the screen associated with a button displayed by the controllable device application 250. The controllable device application 250 therefore responds as if a user pressed the portion of the screen associated with the button, but without a user actually pressing the portion of the screen associated with the button. Although the foregoing example is described with regard to pressing a virtual button of a GUI, it should be appreciated that other interactions such as swiping, tapping, long pressing, and multipoint gestures (e.g. pinch, etc.) may be emulated/simulated for respective virtual or physical control interface features.

As another example, the instructions from the user interface application server computer 380 may direct the user interface application 150 on how to send a message to the controllable device application 250 requesting the desired command be sent from the controllable device application 250 to the controllable device 200. The user interface application server computer 380 determines 414 the procedure to control the controllable device application 250 to cause the controllable device application 250 to send the command to the controllable device 200. The determination may be done by requesting control instructions from a memory of the user interface application server computer 380. The user interface application server computer 380 then sends 416 the instructions to the user interface application 150. The user interface application 150 then executes 418 the instructions received from the user interface application server computer 380, directing the controllable device application 250 to send 420 the requested control command or message to the controllable device 200. This may be done, for example, over the network 300. The controllable device 200 then performs 422 the requested state change, status response, or other action in response to the control command or message.

Figure 5A:
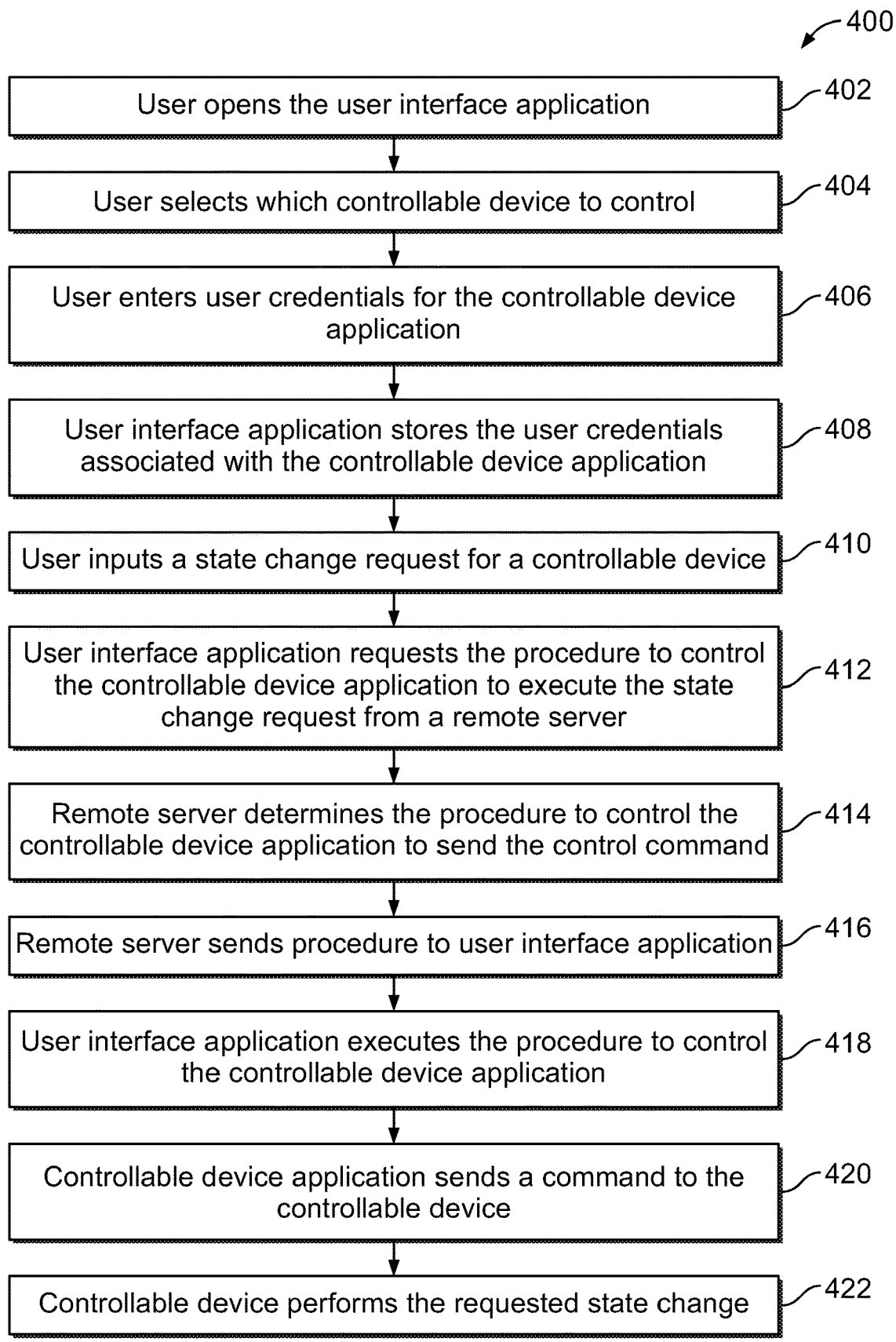
FIGS. 5A and 5B are flow charts of example methods of assimilating controllable device applications to the user interface application of FIG. 4A.
Figure 5B:
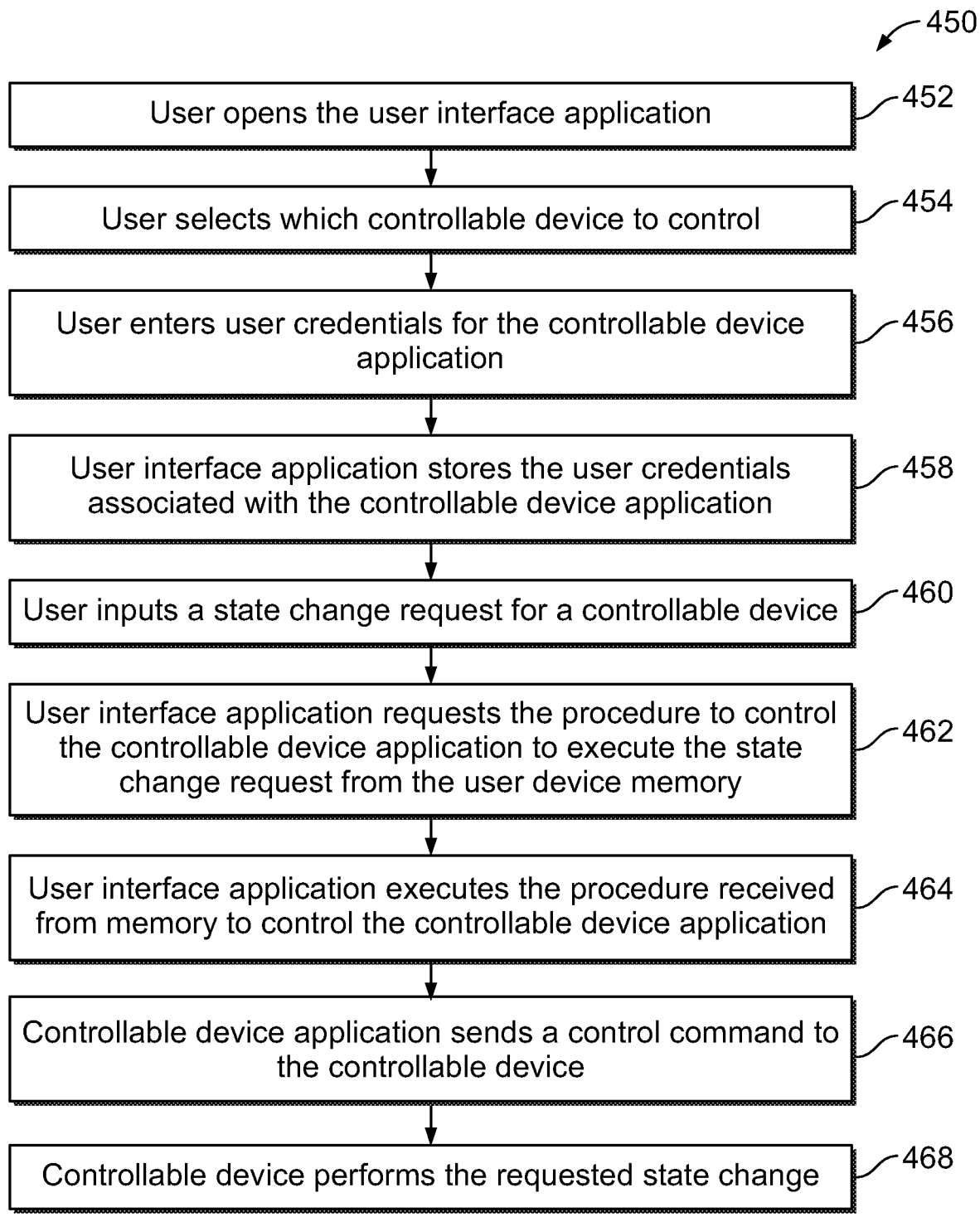

Regarding FIG. 5B, a method 450 is provided that is similar in many respects to the method 400 of FIG. 5A and includes similar operations 452, 454, 456, 458, 460, 464, 466, 468. One difference between the methods 400 and 450 is that in method 450, at operation 462, the user interface application 150 does not request instructions from the user interface application server computer 380. The user interface application 150 may have the instructions to carry out the user request stored on the user device 100. In this embodiment, the user interface application 150 requests 462 the instructions from the memory 115 of the user device 100 and executes 464 the instructions received. The instructions stored in the memory 115 of the user device 100 may be downloaded onto or otherwise determined or learned by the user device 100, for example when the user interface application 150 determines that a controllable device application 250 has been installed or executed. The user interface application 150 may be configured to periodically request updated instructions from the user interface application server computer 380. The user interface application server computer 380 may also be configured to automatically send the updated instructions to the user interface application 150 when the instructions stored on the user interface application server computer 380 are changed. Alternatively, the user device 100 displays a notification to the user when new instructions are available to be downloaded.

In yet another embodiment, the instructions for controlling the controllable device application 250 are stored on the user device 100, but if the user interface application 150 is unable to successfully complete the user request, the user interface application 150 then requests updated instructions from the user interface application server 380. The instructions stored on the user device 100 may no longer work for controlling the controllable device application 250 if, for example, the controllable device application 250 was updated or the layout of the application 250 changed. In this situation, upon an unsuccessful attempt to control the controllable device 200, the user interface application 150 sends a request to the user interface application server 380. If the user interface application server 380 contains updated instructions for controlling the controllable device application 250, the user interface application server 380 sends the new or updated instructions to the user device 100 which then may be accessed by the user interface application 150. The user interface application 150 then executes the new instructions to control the controllable device application 250 to send the desired command to the controllable device 200.

In another example embodiment, the user interface application 150 learns or otherwise determines the procedure or steps for causing the controllable device application 250 to send a command indicative of a state change request to the controllable device 200. Such learning or determination may be performed by the user interface application 150 through monitoring the actions a user takes when entering a state change request in the controllable device application 250. For example, the first time a user requests a state change of a controllable device 200 through the user interface application 150, the user interface application 150 opens the controllable device application 250 and prompts the user to make the state change request using the controllable device application 250. The user interface application 150 records the actions performed by the user (e.g. X-Y coordinates of user inputs such as taps, long presses, and/or paths of swipes or gestures) to execute the state change request and stores the actions in memory 115. The actions by the user could be, for example, entering a username and password, selecting a controllable device 200 to control, and pressing a virtual button. In this example, the user interface application 150 records each action taken by the user, including what information they entered for user credentials, which buttons were pressed, where the buttons were located on the screen, and the sequence of buttons pressed. This user input information is then stored in memory 115. The next time a user requests a state change of the controllable device 200 within the user interface application 150, the user interface application 150 performs the actions learned from the user to cause the controllable device application 250 to send the control command to the controllable device 200.

If the locations of user input elements of the controllable device application 250 are continuously changed, the user interface application 150 may use various processes to re-train the user interface application 150 and determine how to control the controllable device application including but not limited to trial and error. For example, the user interface application 150 may try a first type of interaction with the controllable device application 250, monitor for a notification 145, and try a different, second type of interaction with the controllable device application 250 if the expected notification 145 was not detected. Additionally, the user interface application 150 may include a user interface discovery process that identifies specific user interface elements of the controllable device application 250 using one or more of human-readable text recognition, shape recognition, and the like. For example, the user interface discovery process may scan or otherwise look for a specific string of alphanumeric characters such as "open" to identify a user interface element (i.e. virtual/soft button) that when selected causes a garage door opener to actuate and open an associated garage door. Another method is to press all known possible locations using a rapid trial-and-error approach to initiate the requested action and monitor for a notification 145 indicating initiation of the desired operation.

The user interface application 150 may be able to carry out a state change request of a user by having the controllable device application 250 running in the background without being opened or displayed to the user. In another embodiment, upon the user entering a state change request in the user interface application 150, the controllable device application 250 opens and is displayed to the user. The user interface application 150 then provides the correct inputs and presses the correct buttons within the controllable device application 250 to carry out the desired command while visible to the user.

In another embodiment, the user interface application 150 may carry out a user's control of the controllable device 200 by using an application programming interface (API) of the controllable device application 250. If the controllable device application 250 has an API, the user interface application 150 may use the API of the controllable device application 250 to access the data and controls of the controllable device application 250. The user interface application 150 may retrieve the status of each controllable device 200 associated with the controllable device application 250 and display status information within the user interface application 150 to the user. The user interface application 150 may also use the API to send commands to the controllable devices 200 via the controllable device application 250.

Figure 6:
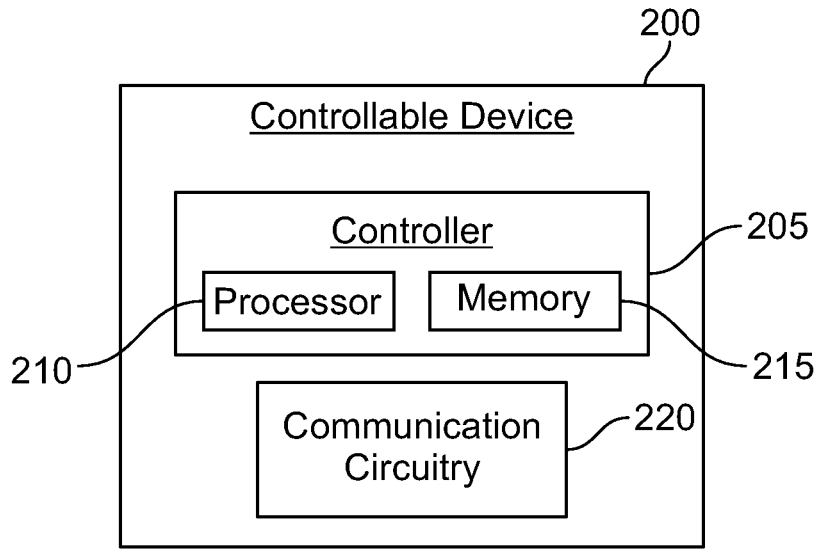
FIG. 6 is an example block diagram of the controllable device of FIG. 1.

With reference now to FIG. 6, the controllable device 200 may include a controller 205 and communication circuitry 220. The controller 205 includes a processor 210 in communication with a memory 215. The controller 205 is in communication with the communication circuitry 220, which may receive wired and wireless commands from remote controls such as portable transmitters, keypads, and smartphones as examples. The communication circuitry 220 may also be configured to send communications to external devices, such as status information to the user device 100 via the network 300 and the controllable device server computer 390. For example, the communication circuitry 220 may receive a state change command from a remote control, the controller 205 determines whether the command is authorized and, if so, communicates with other components of the controllable device 200 to effectuate the requested state change. In one embodiment, the controllable device 200 is embodied as the movable barrier operator 230 such that the controllable device 200 includes a motor, transmission, chain, belt or screwdriver member, rail, and trolley that are configured to move a movable barrier, such as a garage door 231 (see FIG. 1), between closed and open positions upon the movable barrier operator 230 receiving an authorized state change command. Other forms of barrier operators include gate operators, commercial operators and the like.

Figure 7:
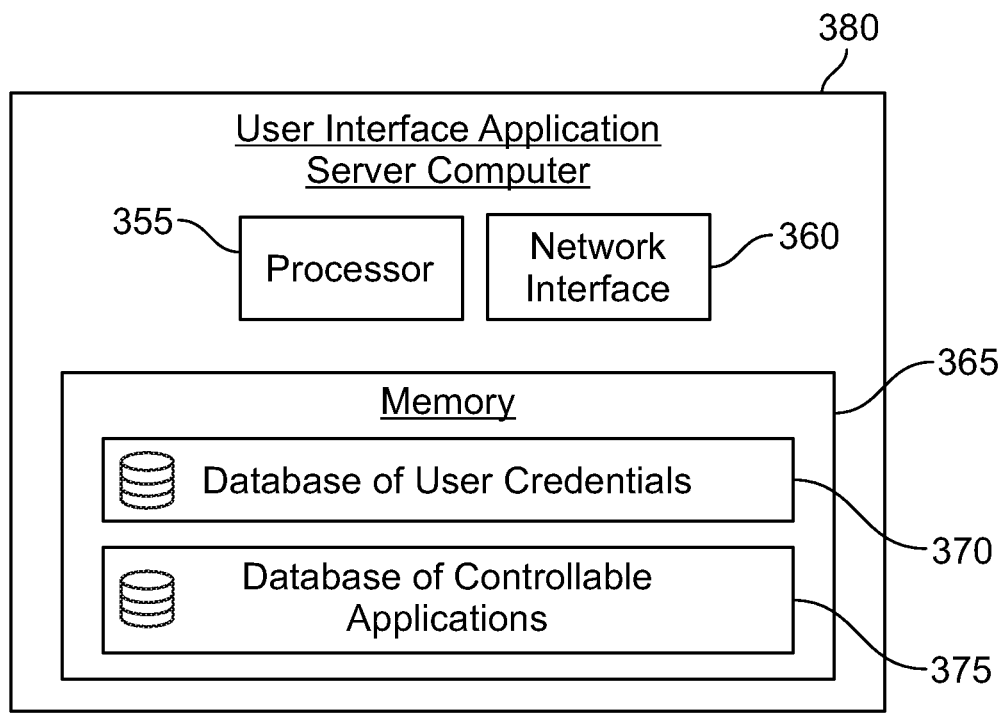
FIG. 7 is a block diagram of an example server computer of the system of FIG. 2.

Referring now to FIG. 7, the user interface application server computer 380 includes a processor 355 in communication with a network interface 360 and a memory 365. The network interface 360 allows the user interface application server computer 380 to communicate with other devices over the network 300. Specifically, the network interface 360 allows the server computer 380 to send information to and receive information from the user device 100 and, optionally, to send information to and receive information from the controllable device 200. The user interface application server computer 380 includes a memory 365 that may store a database of user credentials 370 and a database of controllable applications 375 that the user interface application 150 on the user device 100 may control. The database of controllable applications 375 may also include instructions or information (e.g. screen grabs of interactions with a user interface or elements thereof) for how to control each controllable device application 250. If a user directs the user interface application 150 to assimilate a controllable device application 250 associated with a controllable device 200, the user interface application 150 may request the user credentials for the controllable device application 250 from the server computer 380 instead of or in addition to requesting the user credentials from the user. The user interface application 150 may also request instructions or information for how to control the controllable device application 250 from the user interface application server computer 380. Upon a request from the user interface application 150, the server computer 380 sends the requested information or instructions to the user device 100 over the network 300.

The user interface application 150 is configured to receive or determine the status of controllable devices 200 associated with the controllable device applications 250. The status of each controllable device 200 may be displayed within the user interface application 150 so the user, when operating the user interface application 150, knows the current status of the controllable device 200. The user may then decide to request a status change. In the example where the controllable device 200 is a garage door opener, the status may include an image indicating whether the garage door is open or closed.

Determining the status of a controllable device 200 may be done in a variety of approaches. In one embodiment, the user interface application 150 has stored instructions for operating the controllable device application 250, such as pressing the appropriate buttons and/or controls within the controllable device application 250, to display and read the status of the controllable device 200. The user interface application 150 may operate with the controllable device application 250 running in the background and without being displayed on the user device 100 output (e.g., screen). Alternatively, the user interface application 150 may open up the controllable device application 250 and navigate through the application 250 to determine the status of the controllable device 200 while displaying these steps to the user on the user interface 125. Alternatively, the user interface application 150 may allow the controllable device application 250 to show an identification of the status. If the user interface application 150 is unable to determine the status of the controllable device 200, then the user interface application 150 may request new or updated instructions for determining the status using the controllable device application 250 from the user interface application server 380. Once the controllable device application 250 indicates the status of a controllable device 200, the user interface application 150 reads the status and may display the status for the controllable device 200 to the user in the user interface application 150.

Figure 8A:
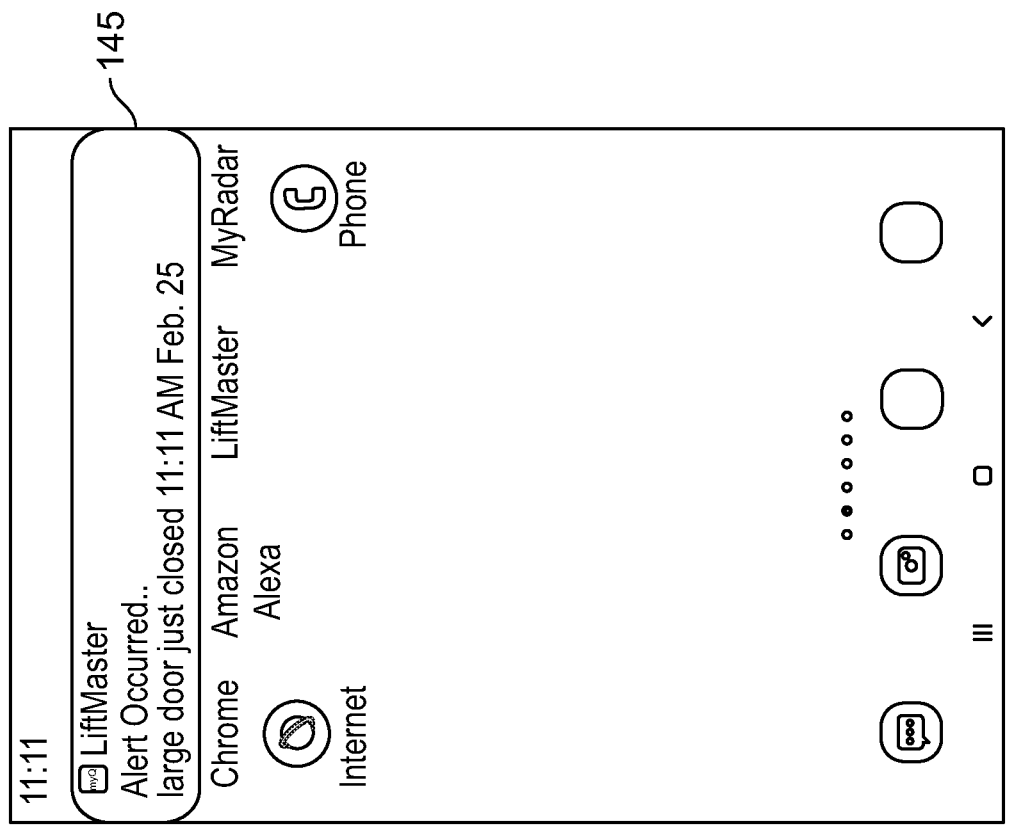
FIG. 8A is an example of a pop-up notification on a user interface of the user device of FIG. 3.

Regarding FIG. 8A, in some embodiments, the user interface application 150 reads notifications 145 pushed to or otherwise received by the user from the operating system 130. A notification may be, for example, an alert generated or otherwise output by an application running on the user device 100 that the application presents to a user about new information, a change, or an event associated with the application. For example, the controllable device 200 may be a garage door opener and the controllable device application 250 receives information from one or more of the server computers 385, 390 regarding a state of the garage door (e.g., open, closed, opening, closing), a change in the state of the garage door, and/or error messages (e.g., an object was detected by photoeyes of the garage door opener during closing of the garage door). The controllable device application 250 sends notifications to the operating system 130 based on the information received from the server computers 385, 390 and the operating system 130 facilitates presentation of the notifications to the user via the user interface 125.

As another example, a notification may be a message received at the user device 100 from a remote server such as one or more of the server computers 385, 390 regarding a state, a state change, or another event associated with the controllable device 200. The operating system 130 may receive the notification from the server computer 385, 390 without involvement from the controllable device application 250.

Notifications are presented to the user if the user has requested to be alerted of certain information or the application automatically provides the information to the user. The notifications permit a user to monitor changes and updates occurring in applications without having to open each application to check for new information, a change, or an event. For example, when a garage door opens, the controllable device application 250 associated with the garage door opener may display a notification 145 to the user that the garage door has been opened. The user did not have to open the controllable device application 250 that sent the notification to view the status of the garage door.

When a controllable device application 250 of the user device 100 seeks to present a notification 145 to the user, the operating system 130 determines whether the user has selected to receive that type of notification from that application 250. The notification 145 of the controllable device application 250 may be received by the operating system 130 of the user device 100 from the controllable device application 250 installed on the user device 100. In one example, the notification 145 is received by the operating system 130 from the controllable device application 250 via a notification application programming interface. In another example, the notification 145 may be received at the user device 100 from the server computer 385 associated with the controllable device application 250. The notification 145 may be received directly from the controllable device application server computer 385 or may be received indirectly from the controllable device application server computer 385 via a push notification server associated with the operating system 130 of the user device 100. The operating system 130 may receive these notifications 145 via a push application programming interface that allows a notification manager 130A (see FIG. 4B) of the operating system 130 of the user device 100 to handle the notification 145 received even when the controllable device application 250 is not running. The push application programming interface may be an interface used to subscribe the controllable device application 250 to a push service and receive push messages by the notification manager 130A of the user device 100. The operating system 130 or the notification manager 130A of the operating system 130 makes a notification-presentation determination by using a notification whitelist 155 (see FIG. 4A) that stores the user's selections of notifications the user wants to receive. If the notification 145 the application 250 seeks to present to the user is on the notification whitelist 155, the operating system 130 displays the notification 145 to the user. As shown in FIG. 8A, the notification 145 may pop up on a screen of the user device 100, and the user may review the notification 145, choose to disregard the notification 145 (e.g., by "swiping" it away), or may choose to review the notification 145 in further detail by, for example, clicking, tapping or pressing on the notification 145 which may open the application 250 that sent the notification 145.

Figures 8C, 9:
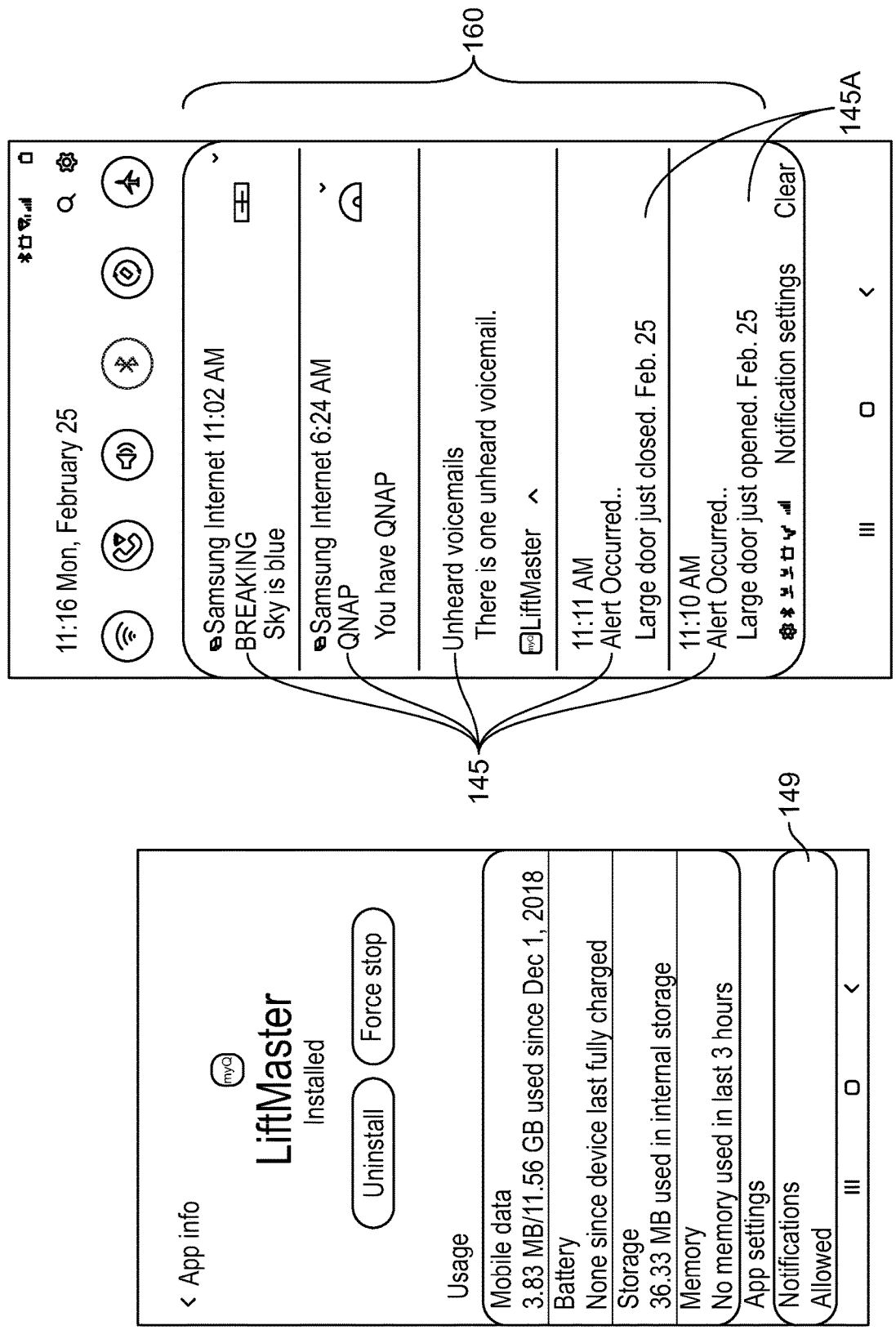
FIG. 8C is an example of a representation of properties of an application installed on the user device of FIG. 3.
FIG. 9 is an example of a log of notifications of the user device of FIG. 3.

As shown in FIG. 9, the operating system 130 keeps a data structure such as a list, file or log 160 of the notifications 145 pushed to and/or presented to the user.

In one embodiment, the user interface application 150 reads the notifications 145 to the user when they display or pop-up on the screen of the user device 100. For example, as shown in FIG. 9, the notifications 145 include notifications 145A from a controllable device application 250 displayed on the user device 100 screen. The user interface application 150 reads these notifications 145A as they are received or presented to the user and displayed on the screen of the user device 100. This reading operation may be performed by receiving the notification, reviewing the notification history or by optical character recognition. After reading the notifications 145A, the user interface application 150 stores the status of the controllable device 200 identified by the notifications 145A in memory 115 and displays the current status of the controllable device 200 to the user within the user interface application 150. Alternatively, the user interface application 150 may copy the text of the notification and display the text of the last notification to the user, allowing the user to determine whether they would like the current status of the controllable device 200 to be changed. In another approach, when the notification 145 is presented to the user as a pop-up notification, the user interface application 150 duplicates (e.g. by taking a screenshot or otherwise capturing an image of) the screen displayed to the user via the user interface 125. The screenshot is then processed or reviewed by the user interface application 250 to determine whether the notification 145 is associated with the controllable device application 250 and pertains to the status of the controllable device 200. In another approach, the screenshot is communicated to the user interface server computer 380 for processing of the content of the notification 145. Upon making a determination of a status of the controllable device 200, the user interface server computer 380 sends the status of the controllable device 200 to the user interface application 150 which may then display the status to the user via the user interface 125.

Figure 10:
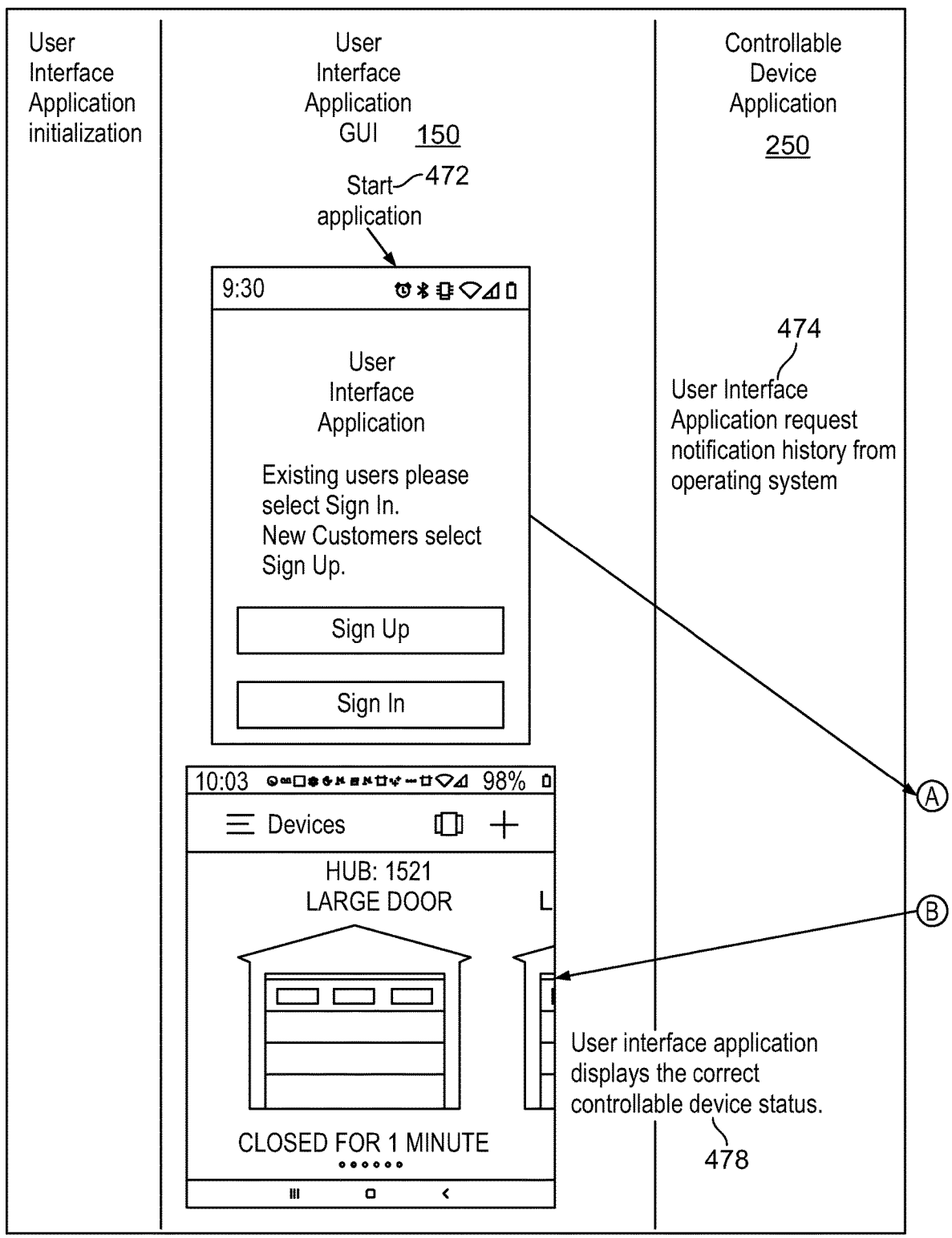
FIG. 10 is an example flow diagram of the user interface application of FIG. 4A receiving the status of the controllable device of FIG. 1.
Figure 10:
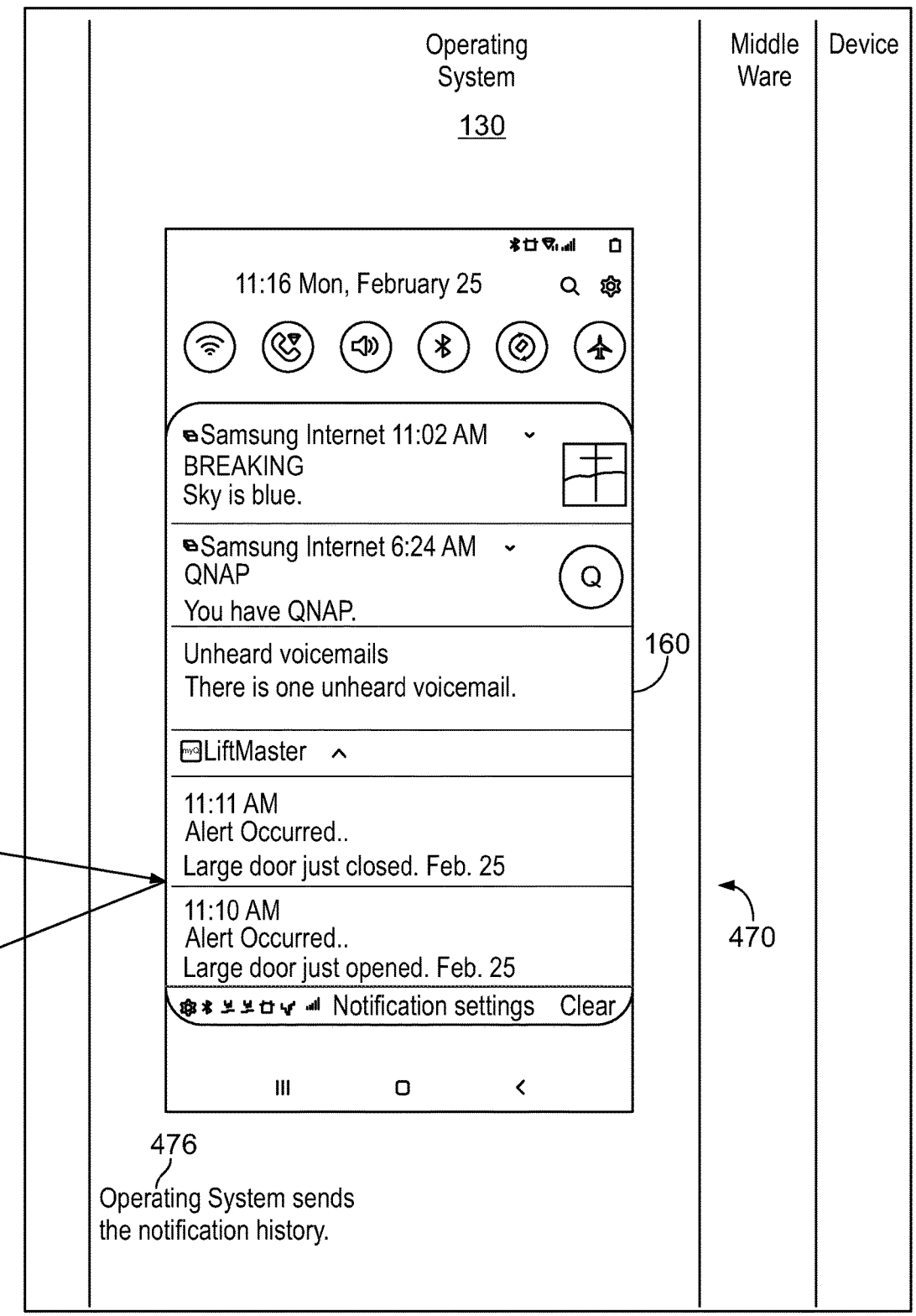

With respect to FIG. 10, a method 470 is provided that enables the user interface application 150 to obtain and display status information of a garage door opener associated with the controllable device application 250. First, the application 150 is started 472 for example by a user. The user interface application 150 may determine the status of the controllable device 200 by requesting 474 the notification history from the operating system 130. As explained previously, when an application of the user device 100 presents a notification 145 to the user, the user device 100 keeps a record of each notification 145 sent to the user in the notification log 160 as shown in FIG. 9. In FIG. 9, the notifications 145A disclose "large door just opened" and "large door just closed." When the user interface application 150 requests the notification log 160 from the operating system 130, the operating system 130 sends 476 the notification log 160 or one or more notifications 145 thereof to the user interface application 150 to determine the controllable device 200 status to display to the user.

In another approach, the user interface application 150 does not request the notification history from the operating system 130, but rather reviews the notification log 160 of the operating system 130. In one example, the user interface application 150 itself reviews the notification log 160 of the operating system 130. In yet another approach, the user device 100 includes a notifications application that the user interface application 150 controls to review the notification log 160 of the user device 100. As one example, the user interface application 150 opens the notifications application and navigates to the portion of the notification application displaying the notification history information by emulating user inputs. The notification history information of the notifications application may be based at least in part on the notification log 160. The user interface application 150 may then read the notifications from the notifications application using the approaches disclosed herein.

The user interface application 150 may be able to read the notifications 145 of the controllable device application 250 (such as those shown in FIG. 9) by optical character recognition. For example, after reading the notification 145 in the log 160, the user interface application 150 stores the status of that particular controllable device 200 in memory 115 and displays 478 the current status of that controllable device 200 to the user within the user interface application 150. Because the "Large door just closed" is the most recent notification, the user interface application 150 displays a closed garage door image in FIG. 10.

Figure 11:
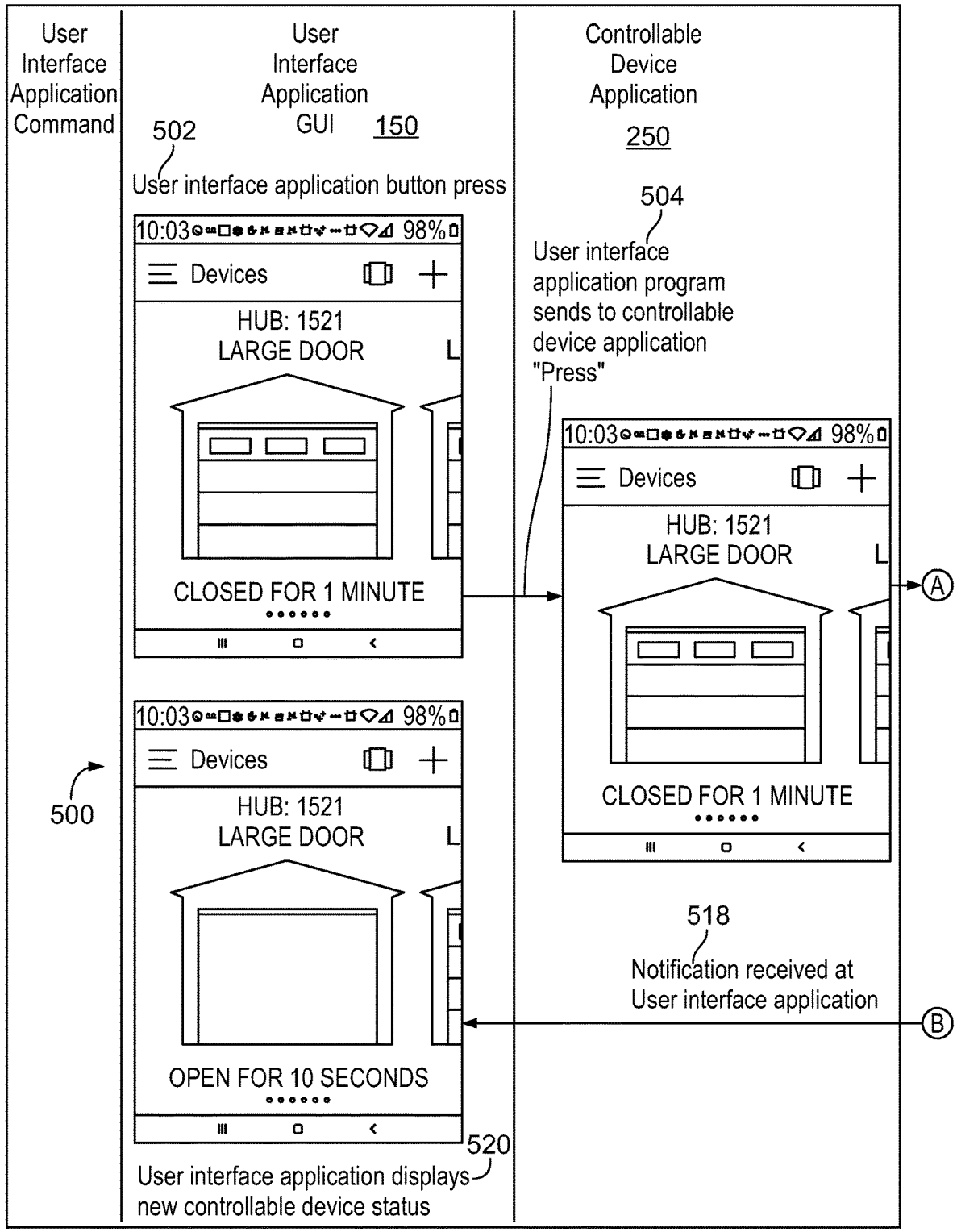
FIG. 11 is an example flow diagram showing the user interface application of FIG. 4A operating a controllable device via the controllable device application and the operating system of the user device.
Figure 11:
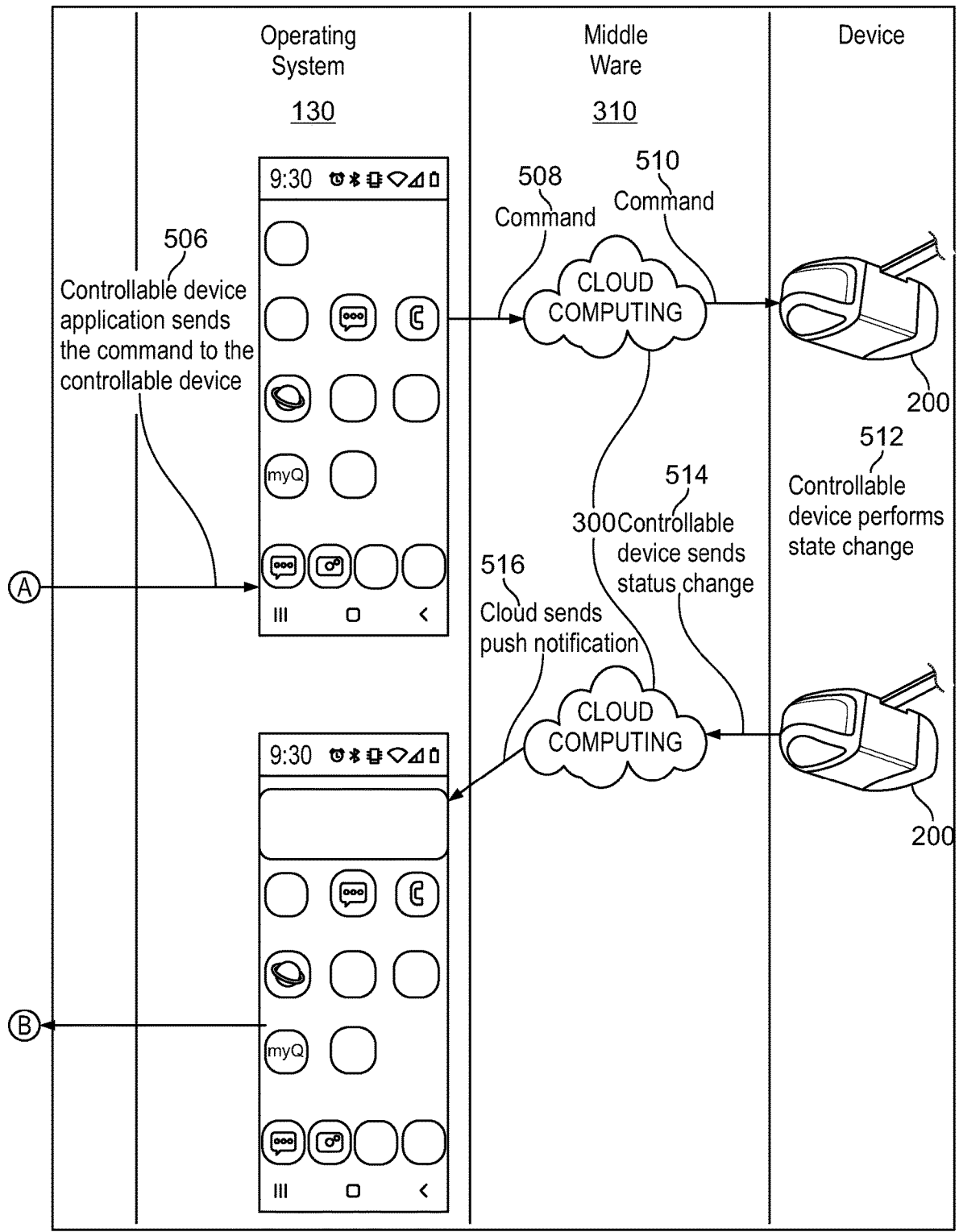

In another approach, the user interface application 150 is configured to continuously or periodically monitor the notifications received or pushed to the user by the operating system 130. For example, the user interface application 150 may review each notification output or generated by applications of the user device 100 or the server computers (e.g., controllable device application server computer 385) associated with the applications of the user device 100. The user interface application 150 may be configured to monitor the notifications received by the operating system 130 via a user interface application programming interface with the operating system 130. In another example, the user interface application 150 may be configured to monitor the push notifications received from a push notification service associated with the user device 100 and/or the applications of the user device 100. The user interface application 150 may determine whether the application or application server generating the notification is associated with the controllable device 200. If the application or application server is associated with the controllable device 200, the user interface application 150 may determine whether the notification pertains to a status change of the controllable device 200. The user interface application is thus able to monitor the status of the controllable device 200 by monitoring notification information received at the operating system 130 from various sources regarding the status of the controllable device 200. Regarding FIG. 11, a method 500 is provided for: sending a command to the controllable device 200 using the user interface application 150; and receiving a status update within the user interface application 150 once the command has been completed. More specifically, a user utilizing the user interface application 150 selects the controllable device 200 and selects 502 the desired state change request to send to the controllable device 200. The user interface application 150 currently displays an image of a closed garage door. The user interface device 150 controls 504 the controllable device application 250 and causes the application 250 to send 506 the corresponding command to the operating system 130. The operating system 130 sends 508 the command to the controllable device 200 over the network 300. In another approach, the device application 250 may communicate directly with the middleware 310.

When sending the command to the controllable device 200 over the network 300, the command may be sent, for example, from the user device 100 to middleware 310, which may be hosted on servers 385, 390. The middleware 310 may be software that receives the command sent from the user device and translates the command into a command that can be understood by another device, such as the controllable device 200. The command is then sent 510 from the middleware 310 to the controllable device 200. The controllable device 200 performs 512 the state change requested by the command. Upon completion of the state change, the controllable device 200 sends 514 status change information over the network 300 to one or more of the server computers 385, 390 which send 516 a push notification to the operating system 130. The status change information is received by the operating system 130 of the user device 100. The operating system 130 presents a notification 145 of the status change of the controllable device 200 to the user. The user interface application 150 detects 518 the notification 145 and displays 520 the new status of the controllable device 200. For example, the user interface application 150 now displays an image of an open garage door.

Figure 12:
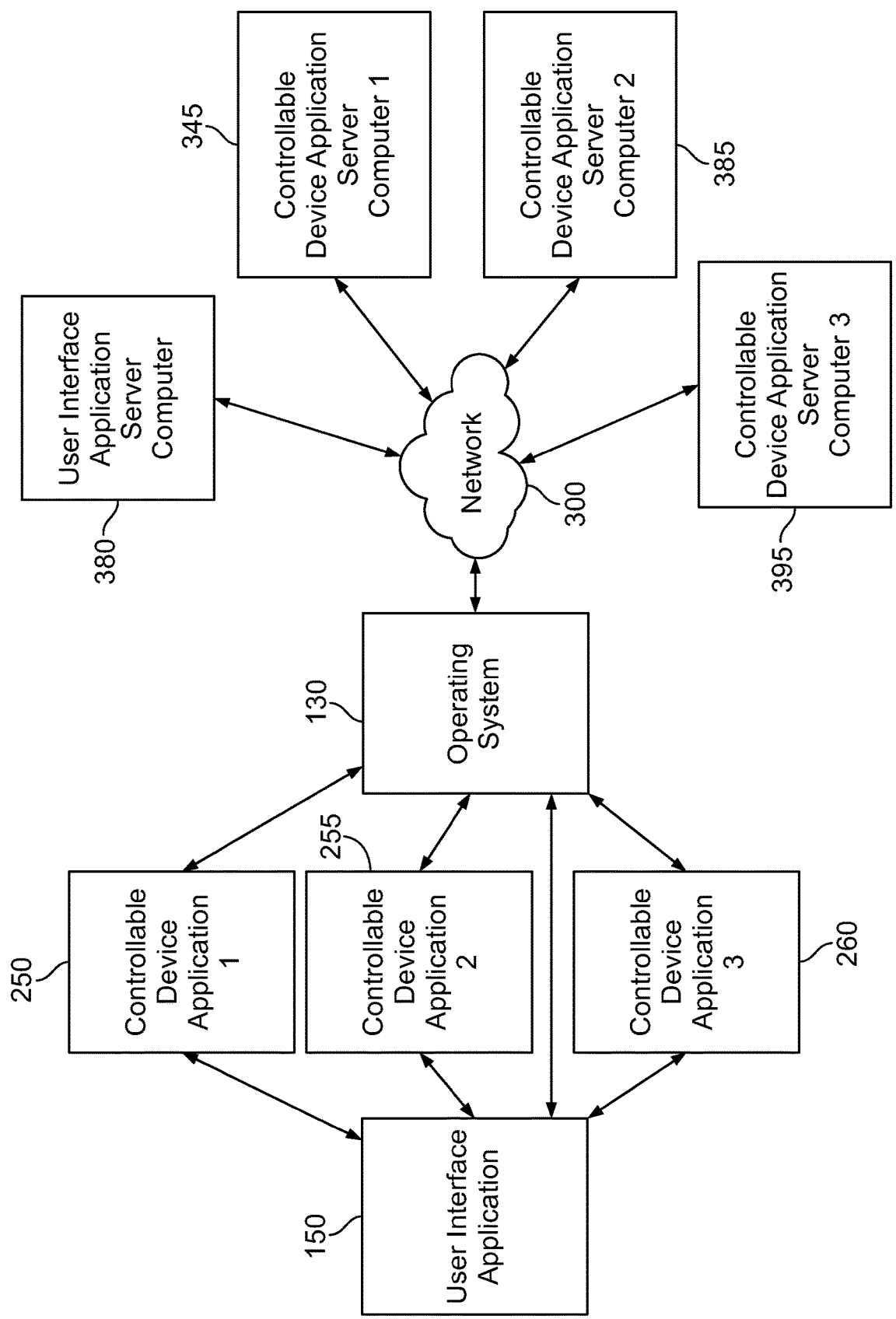
FIG. 12 is an example block diagram showing a user interface application in control of multiple controllable device applications and communicating with server computers associated with the controllable device applications.

Regarding FIG. 12, the user interface application 150 may be configured to control one or more controllable device applications 250, 255, 260 each associated with one or more controllable devices 200. In the example shown in FIG. 12, there are three different controllable device applications 250, 255, 260 although the application 150 may control two, four, or more controllable device applications. Each controllable device application 250, 255, 260 is initially configured by the user to control one or more associated respective controllable devices 200. For example, the user may enter the user's credentials (e.g. username and password) into each controllable device application 250, 255, 260 and a globally unique identifier (GUID) for the associated controllable device(s) 200. Each controllable device application 250, 255, 260 may have a corresponding or complementary server computer 345, 385, 395 with which the application 250, 255, 260 communicates via the network 300 to receive status updates from and send commands to the respective controllable device(s) 200.

The user interface application 150 is configured to control all three controllable device applications 250, 255, 260 in the manner previously described with respect to application 250. The user interface application 150 monitors and stores the status of each of the controllable devices 200 associated with each of the controllable device applications 250, 255, 260. The user interface application 150 is configured to perform operations to control each controllable device application 250, 255, 260 using instructions stored on the user device 100 and/or by requesting instructions or information from the user interface application server 380. This user interface application 150 controls the controllable devices 200 according to the methods previously described for controlling the controllable device application 250.

In one example, the user interface application 150 may be an e-commerce application. A user purchases an item using the user interface application 150 and subsequently receives a message from a delivery associate (e.g., a person or a drone) that the delivery associate is at the user's home to deliver a package containing the item. The user may desire the package to be placed inside their garage or to be placed within the entryway of the user's home. To do this, the user may then open the user interface application 150 and request the state of the garage door be changed from closed to open. The user interface application 150 controls the controllable device application 255 associated with the garage door opener to open the garage door of the user's house. The controllable device application 255 may be, for example, the garage door opener manufacturer's application developed to control the garage door opener. Once the user receives confirmation that the package has been placed within the user's garage, the user may then request closure of the garage door from within the user interface application 150. The user interface application 150 once again controls the controllable device application 255 to send a command to close the garage door.

The next time the user utilizes the user interface application 150 to order an item, the user may desire to have the package containing the item placed within the entryway of the user's house inside the front door. When the delivery associate arrives at the house to deliver the package, the user may use the user interface application 150 to control a controllable device application 260 associated with the front door lock to unlock the front door. Once the package has been delivered in the entryway, the user may utilize the user interface application 150 to control the controllable device application 260 and lock the front door. The user interface application 150 once again controls the second controllable device application 260 to send a command to lock the door. In both instances, the user utilized the same user interface application 150 to control both the garage door opener and the front door lock without having to open and/or switch between any controllable device applications 250, 255, 260.

In another embodiment, the user's control of the controllable device 200 using the user interface application 150 involves the user authorizing another entity to control the controllable device 200. For example, the user interface application 150 with e-commerce functionality requests a user's authorization for the delivery associate to open and close the user's garage or unlock the user's front door. This request for authorization from user interface application 150 may be done when the user purchases an item within the user interface application 150 that will be delivered to the user's home. The request for authorization may also be sent to the user through a notification from the user interface application 150 at any time before the package is delivered, for example, on the morning of the day the package is going to be delivered. Upon the user authorizing the delivery associate to control one or more controllable devices 200, the user interface application 150 causes the operating system 130 to request the user interface application server 380 to send a credential (e.g., a digital token) to the delivery associate. For example, the credential may be sent to the delivery associate's smartphone for later use to open a garage door or front door lock of the user's home.

Once the delivery associate has received authorization from the user to open and close the user's garage door or unlock the user's front door of their house, the delivery associate will be able to operate the user's garage door or front door lock when the delivery associate arrives to deliver the package without having to wait for the user to open the garage door or unlock the front door. For example, when the delivery associate arrives at the user's home, the delivery associate may use the delivery associate's user device 100 (e.g., a smartphone or tablet computer) to send a command to the garage door opener to open and close. In one example, the delivery associate requests the user's garage door be opened using the delivery associate's smartphone. The delivery associate's smartphone communicates the request to the controllable device application server 345. The controllable device application server 345 verifies the delivery associate is authorized to open the garage door, e.g., by confirming receipt of a digital token from the delivery associate's user device 100. If the delivery associate is authorized, the controllable device application server 345 operates the garage door opener as if the user had requested a change in status of the garage door opener.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A user device for interacting with a controllable device, the user device comprising:
    a processor configured to execute a user interface application, a controllable device application, and an operating system of the user device;
    communication circuitry operatively coupled to the processor, the communication circuitry configured to facilitate communication between the controllable device application and the controllable device; and
    a user interface operatively coupled to the processor;
    the user interface application configured to detect a notification of the controllable device application communicated to the operating system, the notification pertaining to a state of the controllable device associated with the controllable device application;
    the user interface application configured to determine the state of the controllable device based at least in part on the notification of the controllable device application communicated to the operating system of the user device; and
    the user interface application configured to provide, via the user interface, the state of the controllable device determined by the user interface application;
    wherein the user interface is configured to receive a user input for the user interface application requesting a state change of the controllable device; and
    wherein the user interface application, based on receipt of the user input, is configured to provide an emulated user input to the controllable device application via the operating system to cause the controllable device application to effect the state change;
    wherein the user interface application is configured to:
    determine whether the controllable device application is running; and
    open the controllable device application, when the controllable device application is determined to not be running, before providing the emulated user input that causes the controllable device application to effect the state change.

2. The user device of claim 1, wherein the user interface application is configured to detect the notification of the controllable device application communicated to the operating system and determine the state of the controllable device without the user interface application communicating directly with the controllable device application.

3. The user device of claim 1, wherein the user interface application is configured to detect the notification of the controllable device application communicated to the operating system by monitoring a notification log of the operating system.

4. The user device of claim 1, wherein the user interface application is configured to detect the notification of the controllable device application communicated to the operating system by monitoring push notifications received by the user device.

5. The user device of claim 1, wherein the user interface application is configured to detect the notification of the controllable device application communicated to the operating system of the user device by monitoring notifications received at the user device from a server computer.

6. The user device of claim 1, wherein the user interface application is configured to determine the state of the controllable device using optical character recognition to process the notification.

7. The user device of claim 1, wherein the notification of the controllable device application is communicated to the operating system from the controllable device application.

8. The user device of claim 1, wherein the user interface application is configured to determine the state of the controllable device application by emulating a user input to operate the controllable device application.

9. The user device of claim 8, wherein the user interface application is configured to emulate the user input by emulating at least one user input that navigates to a portion of the user interface of the controllable device application indicating the state of the controllable device; and
   wherein the user interface application is configured to determine the state of the controllable device by reviewing the portion of the user interface of the controllable device application.

10. The user device of claim 1 wherein the user interface application is configured to detect a subsequent notification of the controllable device application communicated to the operating system, the subsequent notification pertaining to a subsequent state of the controllable device associated with the controllable device application;
   the user interface application configured to determine the subsequent state of the controllable device based at least in part on the subsequent notification of the controllable device application communicated to the operating system of the user device; and
   the user interface application configured to provide, via the user interface of the user device, the subsequent state of the controllable device determined by the user interface application.

11. The user device of claim 1 wherein the processor is configured to execute a second controllable device application for a second controllable device;
   the user interface application configured to detect a second notification of the second controllable device application communicated to the operating system of the user device, the second notification indicating a state of the second controllable device;
   the user interface application configured to determine the state of the second controllable device based at least in part on the second notification of the second controllable device application communicated to the operating system of the user device; and
   the user interface application configured to provide, via the user interface, the state of the second controllable device determined by the user interface application.

12. The user device of claim 11 wherein the user interface is configured to receive a user input for the user interface application requesting a state change of one of the controllable device and the second controllable device; and
   the user interface application is configured to provide, via the operating system, an emulated user input to the controllable device application or the second controllable device application to cause the controllable device application or the second controllable device application to effect the state change of the one of the controllable device and the second controllable device.

13. A non-transitory computer readable medium having instructions which, when executed by a processor of a user device, cause the processor to perform operations including:
   detecting, by a user interface application of the user device, a notification of a controllable device application of the user device communicated to an operating system of the user device, the notification indicating a state of a controllable device;
   determining, by the user interface application, the state of the controllable device based at least in part on the notification of the controllable device application communicated to the operating system of the user device;
   providing, via the user interface of the user device, the state of the controllable device determined by the user interface application;
   receiving a user input for the user interface application at the user interface of the user device requesting a state change of the controllable device;
   providing, via the operating system, an emulated user input to the controllable device application based on receipt of the user input that causes the controllable device application to effect the state change;
   determining, by the user interface application, whether the controllable device application is running; and
   opening the controllable device application when the controllable device application is determined to not be running before providing the emulated user input to the controllable device application that cause the controllable device application to effect the state change.

14. The non-transitory computer readable medium of claim 13, wherein the detecting and determining operations are performed without the user interface application communicating directly with the controllable device application.

15. The non-transitory computer readable medium of claim 13, wherein detecting the notification of the controllable device application communicated to the operating system of the user device includes monitoring a notification log of the operating system.

16. The non-transitory computer readable medium of claim 13, wherein detecting the notification of the controllable device application communicated to the operating system of the user device includes monitoring push notifications received by the user device.

17. The non-transitory computer readable medium of claim 13, wherein detecting the notification of the controllable device application communicated to the operating system of the user device includes monitoring notifications received at the user device from a server computer.

18. The non-transitory computer readable medium of claim 13, wherein determining, by the user interface application, the state of the controllable device includes using optical character recognition to process the notification.

19. The non-transitory computer readable medium of claim 13, wherein the notification communicated to the operating system is communicated from the controllable device application.

20. The non-transitory computer readable medium of claim 13, wherein determining, by the user interface application, the state of the controllable device includes emulating a user input to operate the controllable device application.

21. The non-transitory computer readable medium of claim 20, wherein emulating the user input to operate the controllable device application includes navigating to a portion of a user interface of the controllable device application indicating the state of the controllable device; and
wherein determining the state of the controllable device includes reviewing the portion of the user interface of the controllable device application.

22. The non-transitory computer readable medium of claim 13, the operations further comprising:
detecting, by the user interface application, a subsequent notification of the controllable device application communicated to the operating system of the user device, the subsequent notification indicating a subsequent state of the controllable device;
determining, by the user interface application, the subsequent state of the controllable device based at least in part on the subsequent notification of the controllable device application communicated to the operating system of the user device; and
providing, via the user interface of the user device, the subsequent state of the controllable device determined by the user interface application.

23. The non-transitory computer readable medium of claim 13, the operations further comprising:
detecting, by the user interface application, a second notification of a second controllable device application of the user device communicated to the operating system of the user device, the second notification indicating a state of a second controllable device;
determining, by the user interface application, the state of the second controllable device based at least in part on the second notification of the second controllable device application communicated to the operating system of the user device; and
providing, via the user interface of the user device, the state of the second controllable device determined by the user interface application.

24. The non-transitory computer readable medium of claim 23, the operations further comprising:
receiving a user input for the user interface application at the user interface of the user device, the user input requesting a state change of one of the controllable device and the second controllable device; and
providing, via the operating system, an emulated user input to the controllable device application or the second controllable device application that causes the controllable device application or the second controllable device application to effect the state change of the one of the controllable device and the second controllable device.

25. A method of utilizing a user device to interact with a controllable device, the user device configured to execute a controllable device application for the controllable device, a user interface application, and an operating system, the method comprising:
detecting, by the user interface application, a notification of the controllable device application communicated to the operating system of the user device, the notification indicating a state of the controllable device;
determining, by the user interface application, the state of the controllable device based at least in part on the notification of the controllable device application communicated to the operating system of the user device;
providing, via a user interface of the user device, the state of the controllable device determined by the user interface application;

receiving a user input for the user interface application at the user interface of the user device requesting a state change of the controllable device;
providing, via the operating system, an emulated user input to the controllable device application based on the user input to cause the controllable device application to effect the state change;
determining, by the user interface application, whether the controllable device application is running; and
opening the controllable device application, when the controllable device application is determined to not be running, before providing the emulated user input to the controllable device application that causes the controllable device application to effect the state change.

26. The method of claim 25, wherein the detecting and determining operations are performed without the user interface application communicating directly with the controllable device application.

27. The method of claim 25, wherein detecting the notification of the controllable device application communicated to the operating system of the user device includes monitoring a notification log of the operating system.

28. The method of claim 25, wherein detecting the notification of the controllable device application communicated to the operating system of the user device includes monitoring push notifications received by the user device.

29. The method of claim 25, wherein detecting the notification of the controllable device application communicated to the operating system of the user device includes monitoring notifications received at the user device from a server computer.

30. The method of claim 25, wherein determining, by the user interface application, the state of the controllable device includes using optical character recognition to process the notification.

31. The method of claim 25, wherein the notification communicated to the operating system is communicated from the controllable device application.

32. The method of claim 25, wherein determining, by the user interface application, the state of the controllable device includes emulating a user input at the user interface to operate the controllable device application.

33. The method of claim 32, wherein emulating the user input to operate the controllable device application includes navigating to a portion of a user interface of the controllable device application indicating the state of the controllable device; and
wherein determining the state of the controllable device includes the user interface application reviewing the portion of the user interface of the controllable device application.

34. The method of claim 25 further comprising:
detecting, by the user interface application, a subsequent notification of the controllable device application communicated to the operating system of the user device, the subsequent notification indicating a subsequent state of the controllable device;
determining, by the user interface application, the subsequent state of the controllable device based at least in part on the subsequent notification of the controllable device application communicated to the operating system of the user device; and
providing, via the user interface of the user device, the subsequent state of the controllable device determined by the user interface application.

35. The method of claim 25 wherein the user device is configured to execute a second controllable device application for a second controllable device, the method further comprising:
- detecting, by the user interface application, a second notification of the second controllable device application communicated to the operating system of the user device, the second notification indicating a state of the second controllable device;
- determining, by the user interface application, the state of the second controllable device based at least in part on the second notification of the second controllable device application communicated to the operating system of the user device; and
- providing, via the user interface of the user device, the state of the second controllable device determined by the user interface application.

36. The method of claim 35 further comprising:
- receiving a user input for the user interface application at the user interface of the user device, the user input requesting a state change of one of the controllable device and the second controllable device; and
- providing, via the operating system, an emulated user input to the controllable device application or the second controllable device application to cause the controllable device application or the second controllable device application to effect the state change of the one of the controllable device and the second controllable device.

37. The method of claim 25 wherein providing, via the user interface of the user device, the state of the controllable device determined by the user interface application includes the user interface providing the state of the controllable device in the user interface application.

* * * * *